(12) United States Patent (10) Patent No.: US 10,086,376 B2
Knofe et al. (45) Date of Patent: Oct. 2, 2018

(54) DUAL INPUT ZONE FORCE FEEDBACK WITH SPRING-MOUNTED SLIDING GUIDE ELEMENT ELECTRICALLY CONTROLLING A MICROPOSITIONING APPARATUS

(71) Applicant: Eppendorf AG, Hamburg (DE)

(72) Inventors: Dieter Knofe, Hamburg (DE); Christian Flucke, Hamburg (DE); Andreas Maass, Hamburg (DE)

( * ) Notice: Subject to any disclaimer, the term of this patent is extended or adjusted under 35 U.S.C. 154(b) by 667 days.

(21) Appl. No.: 13/938,146

(22) Filed: Jul. 9, 2013

(65) Prior Publication Data

US 2014/0024110 A1 Jan. 23, 2014

Related U.S. Application Data

(60) Provisional application No. 61/669,598, filed on Jul. 9, 2012.

(30) Foreign Application Priority Data

Jul. 9, 2012 (EP) .................................... 12005068

(51) Int. Cl.
*B01L 99/00* (2010.01)
*B25J 13/02* (2006.01)
*G05G 9/047* (2006.01)
*G06F 3/038* (2013.01)

(52) U.S. Cl.
CPC ............. *B01L 99/00* (2013.01); *B25J 13/02* (2013.01); *G05G 9/047* (2013.01); *G06F 3/038* (2013.01); *G06F 3/0383* (2013.01)

(58) Field of Classification Search
None
See application file for complete search history.

(56) References Cited

U.S. PATENT DOCUMENTS

| 4,577,141 A | 3/1986 | Saiki et al. |
| 4,587,510 A * | 5/1986 | Kim ...................... G05G 9/047 338/128 |
| 5,677,709 A | 10/1997 | Miura et al. |
| 5,877,748 A * | 3/1999 | Redlich ................... G06F 3/011 345/159 |
| 2004/0181343 A1* | 9/2004 | Wigstrom ............. B01L 3/5027 702/19 |

FOREIGN PATENT DOCUMENTS

| JP | 06-342617 A | 12/1994 |
| JP | H07 227783 A | 8/1995 |
| JP | 08-229859 A | 9/1996 |
| JP | H09 76177 A | 3/1997 |
| JP | 2003 245882 A | 9/2003 |
| JP | 2010-264539 A | 11/2010 |

* cited by examiner

*Primary Examiner* — G Steven Vanni
(74) *Attorney, Agent, or Firm* — Todd A. Lorenz

(57) ABSTRACT

The invention relates to operating apparatus for the control of a movement apparatus, in particular the movement apparatus of a micromanipulator for the manipulation of biological cells, and a method for the control of the movement apparatus. The operating apparatus comprises an electrical control device and an input device with different input zones, by means of which the movement apparatus can be controlled according to different control rules.

17 Claims, 12 Drawing Sheets

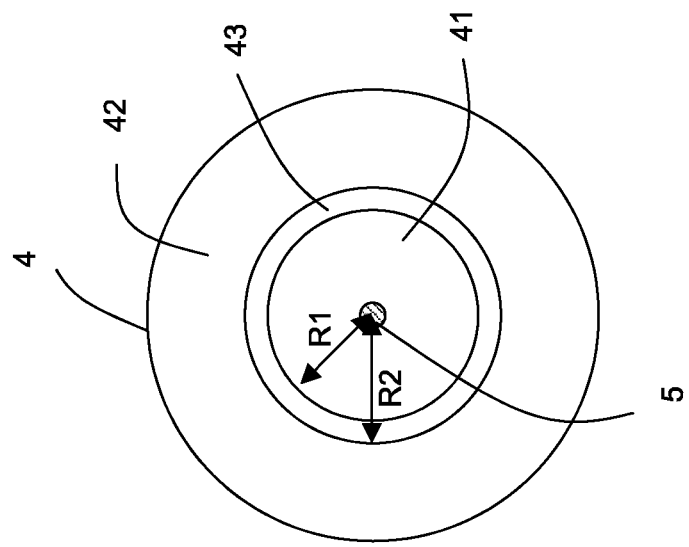
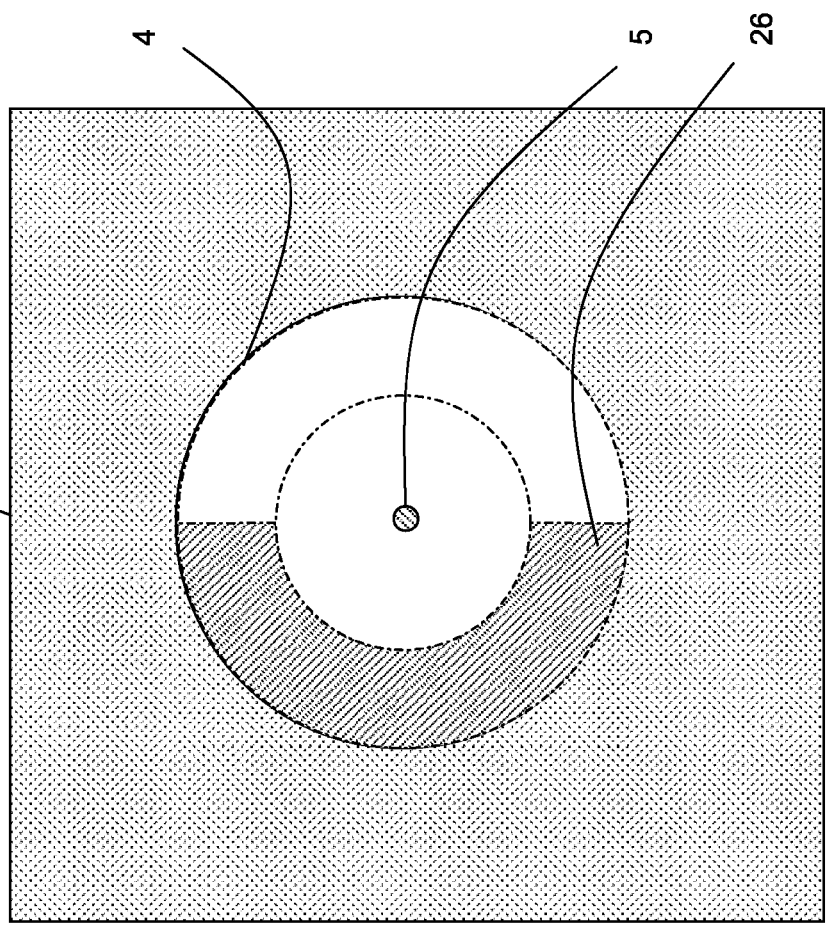

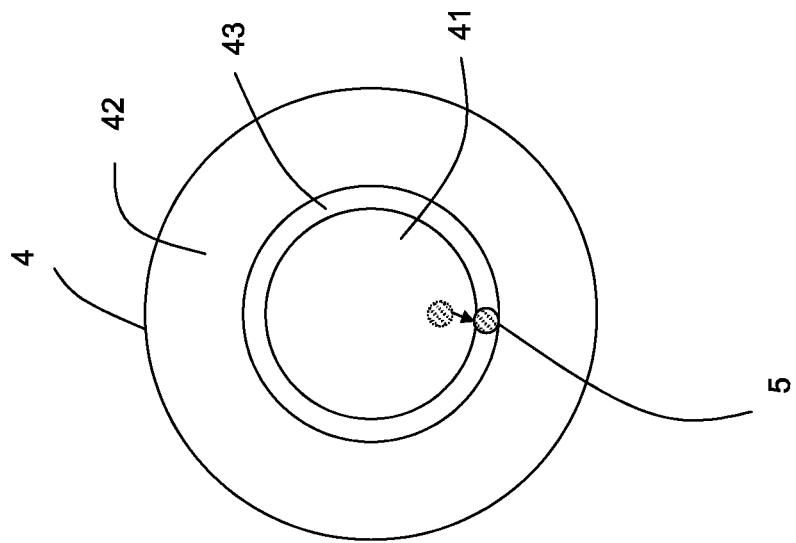
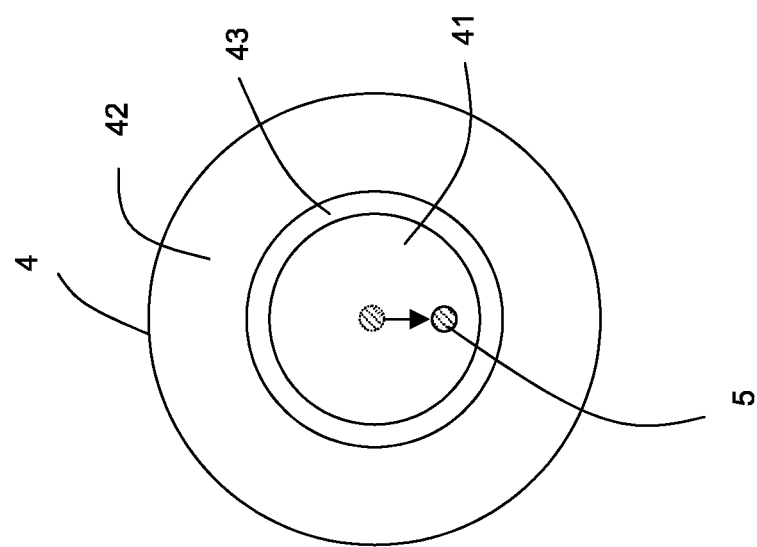

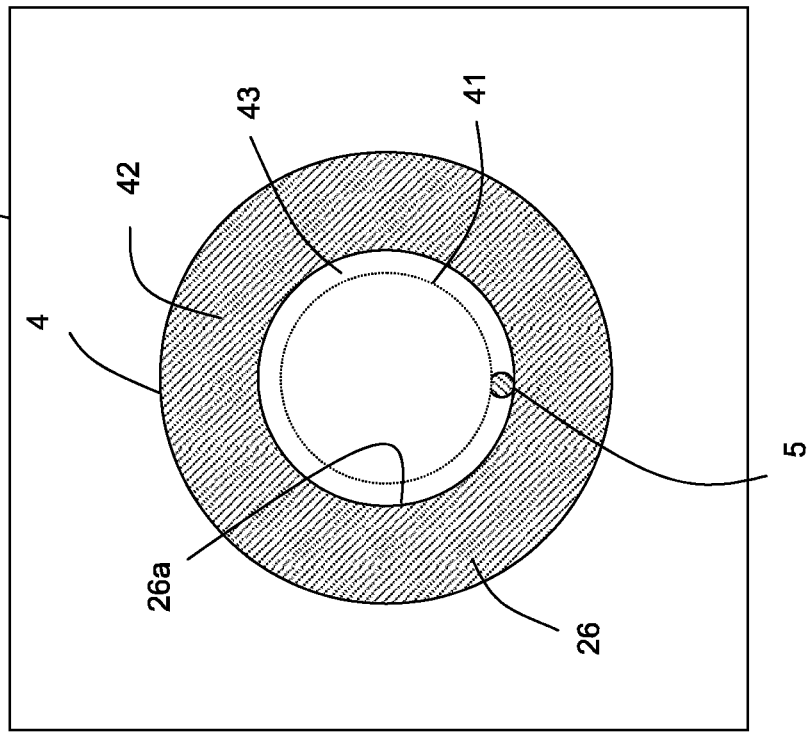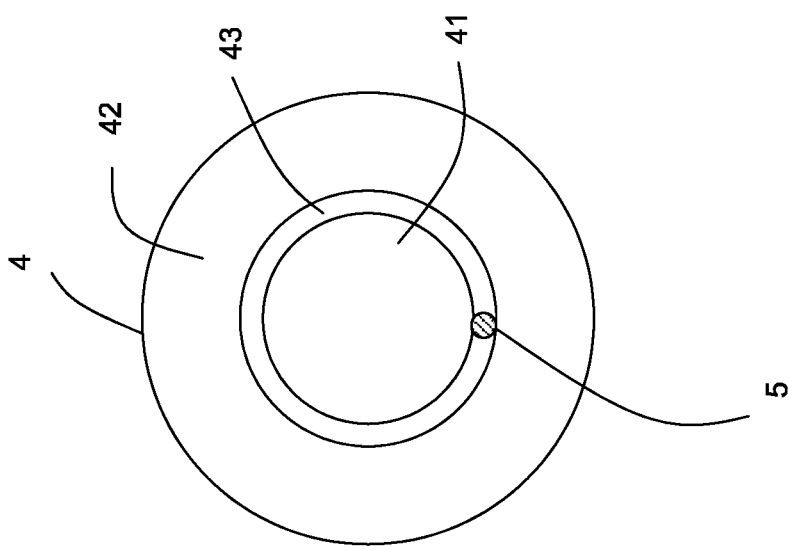

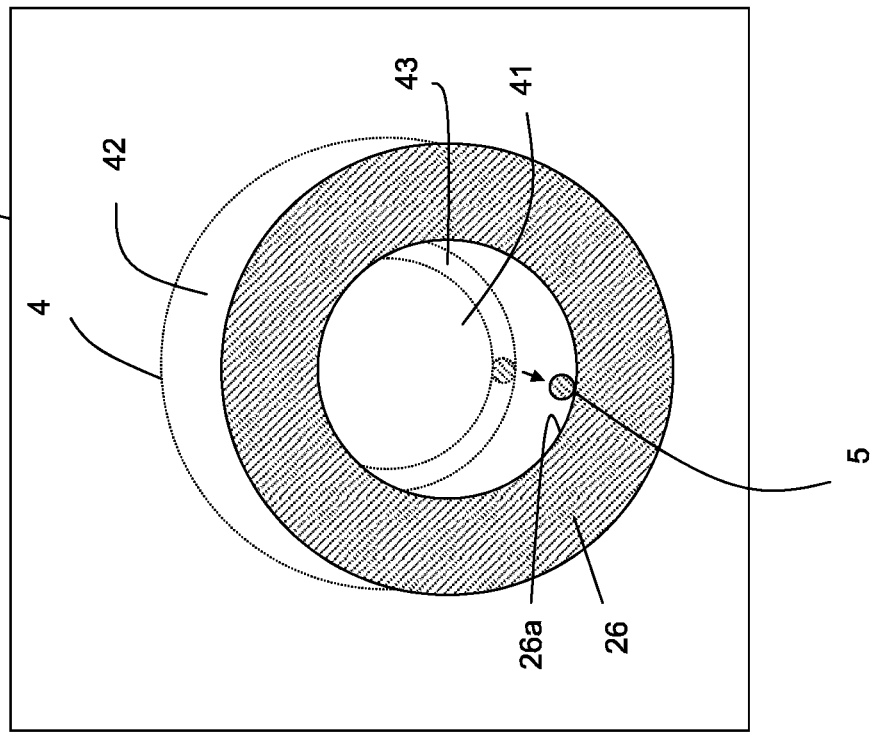
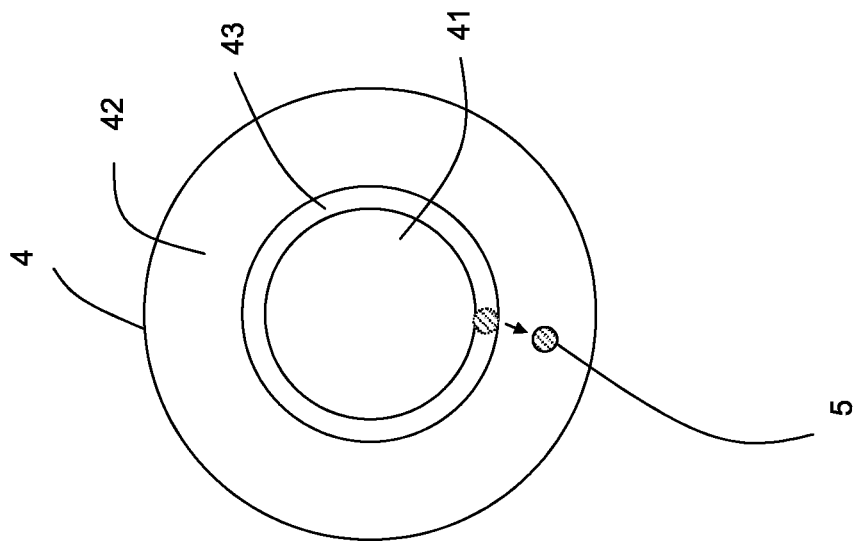

DUAL INPUT ZONE FORCE FEEDBACK WITH SPRING-MOUNTED SLIDING GUIDE ELEMENT ELECTRICALLY CONTROLLING A MICROPOSITIONING APPARATUS

The invention relates to operating apparatus for the control of a movement apparatus, in particular the movement apparatus of a micropositioning apparatus, in particular of a micromanipulator, and a method for the control of the movement apparatus.

Micropositioning apparatus are used for the user-controlled execution of precise movements, whose positional precision or resolution can lie in the range from a few tens of nanometers up to a few micrometers. They are used wherever it is necessary to position a component precisely. Micromanipulators comprise such a micropositioning apparatus, whose movement apparatus can be coupled with a tool. Through exact positioning of the tool, precise manipulations can be carried out on microstructures. Such microstructures may be artificial, such as chip-based microsystems and nanosystems, or can be biological, e.g. living cells. The operating apparatus according to the invention is laboratory equipment, and is applied in laboratories, in particular in microfabrication laboratories, semiconductor laboratories and in biological or medical laboratories.

Known operating apparatus for controlling the movement of a micromanipulator for manipulating biological cells by means of a tool is marketed by Eppendorf AG, Hamburg, Germany, under the name "TransferMan NK2®". This operating apparatus was developed for working procedures in which a proportional movement of the capillary by means of operating apparatus is required. The proportional movement is particularly suitable for intra-cytoplasmic sperm injection (ICSI), the transfer of embryonic stem cells (ES cells) into blastocysts and/or early embryos (eight-cell stage), and for other working techniques in which the precise control of the movement of the tool being used is necessary. The user controls the movement of the micromanipulator by swinging a joystick within its maximum possible input region, where the input region is usually a conical region or a solid angle whose point or origin is the fulcrum of the joystick lever. The solid angle usually corresponds to a straight cone.

In the proportional joystick control mode, i.e. in the case of control by means of a control rule for proportional control, the tool follows the user's control movement directly. The movement or change in position dX of the tool along an axis X here corresponds proportionally to the movement dX' of the joystick along an axis X' made by the user. This can be expressed mathematically as $$dX \sim dX', \text{ or } dX = c \ast dX',$$

where c is a numerical constant.

For a given constant c, the maximum possible input region corresponds to a maximum range of movement of the tool. If the user wants to move the tool beyond the maximum range of movement, the known operating apparatus offers a facility for switching off the proportional control between the joystick and the movement apparatus through pressing a button on the operating apparatus. While the button is pressed, the position of the movement apparatus is not changed, in particular not when the user moves the joystick while the button is pressed. If the user now wants to move the tool beyond the maximum range of movement, then, on reaching an end of the maximum input region of the joystick, he switches off the proportional control by pressing the button, moves the joystick in an opposing direction while holding the button pressed, and reactivates the proportional control by releasing the button, whereupon he can cause the tool to move further in desired fashion over the above-mentioned maximum former range of movement of the tool through proportional control in the familiar way. This procedure of re-engagement can be repeated by the user as many times as may be necessary to move the tool through a desired distance.

Typically, when manipulating cells, the tool must first be moved over a relatively large distance, in the range of millimeters, to approach the cell; in practice, this is usually observed through an optical microscope working at various resolutions. Close to the cell, in particular at a distance of a few cell diameters from the cell, which is to say within a few micrometers or a few tens of micrometers from the cell wall, the user must exercise particular care in order, amongst other things, not to accidentally damage extremely valuable cells. Fine control is necessary close to the cell. In the known operating apparatus, the cell is first approached through repeated operation of the joystick, as described. This repetition of the movement is, however, sometimes found to be inconvenient. This control concept, moreover, appears to be relatively inflexible. The repeated joystick movements also increase the mechanical stress on the operating apparatus.

The document JP2003245882-A belongs to a different technical field and describes a control stick for manipulating a robot arm used in the automotive or semiconductor industry. The document describes that the robot arm operating device has a position control region, a speed-control region and, in between, a hysteresis region, which maintains a conventional control form for preventing that operation of the robot arm is changed suddenly, if the stick passes the transition point between proportional and dynamic control. A spring mechanism returns the control stick back to the center position of the control stick, after the stick is released by the user.

The purpose of the invention is to provide flexible operating apparatus, in particular for the manipulation of biological cells, and a method for the control of a movement apparatus that are flexible and convenient.

The invention fulfils this purpose with the operating apparatus according to claim 1 and the method according to claim 16. Preferred developments are in particular subjects of the dependent claims.

An advantage of the invention is that the control of the movement apparatus is flexible, since through suitable movement of the movable element within the input region, at least two different control rules, that is in particular control modes, can be used. The user, moreover, does not have to change the control rules manually, but effectuates this change between two control rules in an intuitive manner, in that the change takes place automatically when the user moves the movable element from the first input zone into the second input zone.

The movable element can be an actuation element that can be operated by the user, such as a joystick lever, a slide regulator, a rocker element, a trackball and so forth. In this case the movable element can be a constituent of the input device. It is also, however, possible for the movable element not to be a constituent of the input device in that it is, for instance, the tip of a users finger. In this case the input device can comprise, for example, an input region constructed as a touch-sensitive strip, surface or space, such as a touchpad or touchscreen, within which the users fingertip can be moved. A position value assigned to the fingertip is then detected by means of the input device. The input region can be touch-sensitive or can, for example, perform contactless acquisition of the position value of a movable element, for example through an optical measurement. The operating apparatus according to the invention permits, in particular, the intuitive, single-handed control of the movement, so that one of the users hands remains free and is available for other activities.

A position value in the sense of this description is a general term for a variety of physical parameters with which the position and/or movement of a movable element can be characterized. The position refers to a location variable, such as x, y, z, or to an angle, as described below. The movement denotes the speed and, potentially, also the acceleration with reference to one of the location variables. A position value can be a scalar value or a vector value. A position value may thus involve one or more dimensions, and can therefore contain at least one and preferably multiple values. A position value contains at least one absolute or relative position datum, such as the variables x, y and/or z in a Cartesian coordinate system, or the radius and the angle $\alpha$ in a polar coordinate system and/or the radius and the solid angle $\beta$, $\chi$ in a spherical coordinate system, or merely changes to these parameters, i.e. relative positions, that are referred to as positional changes. Alternatively or in addition to the position datum, the position value can also alternatively or in addition include the speeds of the said coordinates, i.e. the rates of change of location with time vx, vy, vz, vR, v$\alpha$, v$\beta$, v$\chi$ of this position data. Alternatively or in addition to this, the position value can also alternatively or in addition include the speeds of the said coordinates, i.e. the rates of change of speed with time ax, ay, az, aR, a$\alpha$, a$\beta$, a$\chi$ of this position data. These parameters can adopt positive or negative values, so that the direction of a movable element can be unambiguously characterized. The input device can, in particular, provide for a movement and acquisition of the movable element in one, two or three dimensions. The input signal can, in addition, contain time information.

The first control rule and the second control rule are always different. The first control rule is preferably designed to perform a proportional control. Preferably here, or independently of it, the second control rule is designed to perform a dynamic control. Both these terms are explained in the context of this description. The first control rule and the second control rule can also both involve a proportional control or both involve a dynamic control, where the difference is preferably then that the factor c differs in that, for example, a first proportionality factor c1 is used for the first control rule, while a second proportionality factor c2 is used for the second control rule, where c2 is not equal to c1.

A control rule in the sense of the present invention is a specification provided in the control device, according to which the variable output signal is derived in the control device depending on the variable input signal. Independently of this, the input signal always depends on the position value, so that the output signal also always depends on the position value. The specification can be given by a mathematical function, by a digital and/or analogue electrical circuit and/or by a fixed assignment of output to input signals and/or values required for that purpose in accordance with a table that can be stored in the control device. Through these control rules it is possible, for example, to implement a proportional control of the movement apparatus according to a first control rule or to implement a dynamic control of the movement apparatus according to a second control rule.

Under proportional control, the change in position that is to be carried out by the movement apparatus, in particular a displacement, is proportional to the change in position performed by the movable element. Under proportional control, the output signal of the control device is formed in such a way as to effect the change in position that is to be carried out by the movement apparatus, in particular a displacement, in proportion to the change in position performed by the movable element.

An advantage of the proportional control is that very precise movements of the movement apparatus can be effectuated by the user. In particular, with an especially large reduction, i.e. with a small factor c, a fine adjustment of the tool position of a manipulator is possible, which is in particular suitable for cell manipulation. Cell manipulation comprises micromanipulation, i.e. the holding and transfer of cells using microtools, which are simply referred to as tools elsewhere, e.g. capillaries, along with microinjection and microdissection.

The change in position can refer to a parameter that determines the position, e.g. the x, y and/or z coordinates for a Cartesian coordinate system, and/or the radius and/or angle coordinate(s) of a polar coordinate system or of a spherical coordinate system.

The movable element of the operating apparatus can, for example, carry out such a change in position, and/or this change in position can be appropriately acquired. The movable element can, for example, be capable of one-dimensional translation, e.g. along the x-axis, or can be rotated about this axis. Preferably it is capable of movement in two dimensions, e.g. translation parallel to the x-y plane, or of rotation around at least the x-axis and the y-axis. It may also be capable of three-dimensional movement, e.g. translation in the space of the x-y-z coordinate system and/or rotation about at least the x-axis, the y-axis and/or the z-axis of a coordinate system. It is possible for either only distances along the x, y and/or z-axes to be used, or only angles about these axes to be used. It is also, however, possible for both distances and angles to be used, that is, for instance, for the movable element to be moved and rotated, and for the corresponding parameters to be measured.

It is preferable for an moved element moved by the movement apparatus, e.g. the tool of a micromanipulator, to carry out precisely the kind of changes of position—e.g. x, y or z coordinates, or angles around such an axis—that correspond to the changes in position of the movable element. A translational position change of the movable element along the x-axis, for example, then correspondingly leads to a translational movement of the moved element of the movement apparatus along the x-axis, or along the x'-axis of a different coordinate system (x', y, z). As a further example, a rotational position change of the movable element around the x-axis then correspondingly results in a rotational movement of the moved element of the movement apparatus around the x-axis, or around the x'-axis of a different coordinate system (x', y, z).

It is also possible, and is preferable, for an element moved by the movement apparatus, e.g. the tool of a micromanipulator, to carry out a different kind of positional change from that which corresponds to the type of positional change of the movable element. For example, a translational positional change of the movable element along the x-axis can result in a translational positional change of the moved element along the y or z-axis. The translational positional change of the movable element along the x-axis can also result in a rotational positional change of the moved element about an axis (x, y or z-axis, or some other axis).

The choice of location parameters between which the proportional relationship exists is not crucial to proportional control. What is important for proportional control is that the positional change dP2 of the element moved by the movement apparatus is proportional to the positional change dP1 in the movable element of the input device that is operated by the user, which can be expressed mathematically, for example, as:

$$dP2 \sim dP1 \text{ or } dP2 = c*dP1,$$

where c is a numerical constant. The variables dP1, dP2 can represent a change in displacement or a change in angle. dP1 can relate to a change in displacement, while dP2 can at the same time be a change in angle, or vice versa.

In contrast to proportional control, the speed v maintained by the movement apparatus under dynamic control depends on the relative position P_rel adopted by the movable element. This means that v is preferably a function of P_rel:

$$v = v(P\_rel).$$

The advantage of the dynamic control is that by increasing the speed the moved element can cover a longer distance more quickly, although in a (speed-)controlled way, and therefore conveniently, than, for example, in proportional mode, where in order to cover the same distance, repeated movement of the movable element, or whatever the means of input is, is needed, thereby requiring a longer time and increased effort.

The relationship v(P_rel) can, however, also be defined through assignments in a table of two, three or more dimensions, which can be stored in the control equipment. The parameter v can be a scalar magnitude, or can be a vector, and can include, for example, the speed values vx, vy, vz for different directions of movement x and/or y and/or z and/or relating to an angular velocity vα.

Preferably the speed v maintained by the movement apparatus is proportional to the relative position P_rel adopted by the movable element:

$$v = c*P\_rel,$$

where c is a standardization factor, i.e. for example a numerical figure with the unit "one per second". v can be a scalar or vector magnitude. P_rel can then be understood as the distance from a start point, representing zero velocity, to the current position of the movable element. The relationship v(P_rel) can, however, also be defined in other ways.

The dynamic control preferably is configured such that the change of the velocity v (P_rel), which depends on P_rel, is different from Null, and preferably is larger than Null. That means, preferably the derivation of the function v(P_rel) with respect to the location x=P_rel is larger than Null: (d/dx) v(P_rel)>0 or (d/dP_rel) v(P_rel)>0, such that the velocity increases with increasing P_rel. In particular in the case when the first control rule and/or the third control rule are configured to be a proportional control, the second control rule with (d/dx) v(P_rel)>0 can provide a transition of the motion of the movable element between the first input zone and the second input zone, which can be perceived by the user to be a comfortable, smooth and continuous transition, wherein said continuous transition also increases the preciseness of operation.

Preferably, the dynamic control is configured such that the change of the velocity v (P_rel), which depends on P_rel, is als a function f in dependence on P_rel, (d/dP_rel) v(P_rel)=f(P_rel), wherein f(P_rel) can be, in particular, larger than Null. This way, the change of the velocity v (P_rel), which depends on P_rel, is not constant, but changes in dependence on P_rel, which allows for a more flexible design of the dynamic control. In this manner it can be achieved that the velocity increases disproportionately if, e.g., the movable element is moved outwardly towards a direction P_rel starting from a zero position, e.g. towards a direction along the x-axis of a Cartesian coordinate system starting from the point of origin. The user takes profit by having a more intuitive control on the velocity, in particular in the case that he receives a feedback signal, in particular by a signal device, in particular a haptical feedback signal, e.g. by a reset device, e.g. by the tensioning of a spring device, which may indicate a disproportionate increase of velocity.

Preferably, the dynamic control is configured such that the change of the velocity v (P_rel), which depends on P_rel, is proportional to P_rel: (d/dx) v(P_rel)~P_rel, bzw. (d/dx) v(P_rel)=c*P_rel, wherein x=P_rel and wherein c is an appropriate standardization factor, e.g. a numerical valur with the physical unit 1/(sec*meter). This way, the velocity increases quadratically with respect to P_rel, e.g. v~(P_rel)$^2$. In particular such a control provides a more comfortable and a more precisely operable operating apparatus.

Preferably, the dynamic control is configured such that the change of the velocity v (P_rel), which depends on P_rel, is not constant, but is in particular larger than Null, wherein it is preferred that said change is not described by a continuous function but by, e.g., a table of values, which contains the values of the change of the velocity in dependence on P_rel. It is preferred, in particular, that within a first range of values W1=P_re_1 to P_rel_2 the change of velocity is (d/dx) v(P_rel)~c1, within a second range of values W2=P_re_2 to P_rel_3 the change of velocity is (d/dx) v(P_rel)~c2, within a third range of values W3=P_re_3 to P_rel_4 the change of velocity is (d/dx) v(P_rel)~c3, within an n-th range of values W_n=P_re_n to P_rel_n+1 the change of velocity is (d/dx) v(P_rel)~c_n, wherein n can be a natural number larger than 1, e.g. n=1, 2, 3, 4, 5, 6 or larger and wherein the standardization factors c1, c2, c3, . . . c_n preferably all—or at least a part of them—have different values. Such a description of (d/dx) v(P_rel)~P_rel can be technically realized easy.

Preferably, the second input zone, preferably the whole area of the second input zone, has at least a first zone segment (W1) and a second zone segment (W2), wherein the first zone segment (W1) is arranged between the first input zone (41) and the second zone segment (W2), wherein the values of the change f of the velocity v(P_rel) with respect to the position value P_rel are lower within W1 than within W2, wherein f may be described to be the derivation of v(P_rel) with respect to P_rel, i.e. f=(d/dP_rel) v(P_rel). This way, a more comfortable, intuitive and precise operation of the operating apparatus is achieved. Preferably, the second input zone also has at least a third zone segment (W3), wherein the values of the change f of the velocity v(P_rel) with respect to the position value P_rel are lower within W2 than within W3. This way, an even more comfortable, intuitive and precise operation of the operating apparatus is achieved. Such embodiments may be considered sufficiently flexible and can be technically realized more easily.

The relative position P_rel is preferably measured with reference to a starting position of the movable element, at which it preferably has speed zero.

Under dynamic control, the output signal from the control device is formed in such a way as to drive the moved element of the movement apparatus using this speed v.

The speed can refer to a parameter that determines the speed, e.g. the speed along the x, y and/or z coordinates for a Cartesian coordinate system, and/or the speed along the radius and/or the angular speeds along the angle coordinate(s) of a polar coordinate system or of a spherical coordinate system.

The third input zone can be a dead zone, or can comprise such a dead zone. The third input zone is preferably located between the first and second input zones. Preferably the output signal from the control device is generated according to a third control rule, in particular a control rule for the dead zone, when the movable element is located in the third input zone, in particular the dead zone. Preferably the control rule for the dead zone has the effect that an output signal is generated of such a nature that the moved element of the movement apparatus is not moved when the movable element is located in the dead zone. The third control rule can also provide that the output signal is zero, in particular that at least one data value that is assigned to the output signal or at least one signal voltage level that is assigned to the output signal is zero. Preferably, the control rule for the dead zone has the effect that an output signal is generated of such a nature that the moved element of the movement apparatus is not moved when the movable element is moved within in the dead zone.

Preferably, the input region has at least one third input zone, and preferably the control device is configured such that the output signal is generated by the control device according to a third control rule in dependence on the input signal, if the movable element is arranged in the third input zone.

The third input zone, in particular the dead zone T, preferably comprises a fraction f of the entire input region E, i.e. T=f*E, where T and E may comprise solid angle regions, i.e. conical or partially conical space sectors, areas, lines or volumes, and f is a number smaller than 1, where f preferably is selected from the group of preferred ranges $\{(0.00001<f<0.001); (0.001<f<0.01); (0.01<f<0.03); (0.03<f<0.08); (0.08<f<0.15)\}$. It is possible that f is even smaller than 0.00001. The physical unit of an input zone can be represented by square meters, by degree, or can be otherwise defined. The purpose of the third zone, in particular the dead zone, is to structure the transition between two control rules in a defined manner in order, for example, to prevent the occurrence of fluctuating intermediate states when the joystick lever is located precisely at the boundary between the first and second input zones. In this way in particular tolerances involved in the construction of the input device are compensated for. This can, however, also be achieved without a dead zone in that, for example, a control rule is used for the zone transition within a third zone that operates without stopping the drives of the movement apparatus.

Preferably, also the third control rule of the third input zone, in particular the dead zone, is a proportional control. This offers the advantage that the moved element is not moved in case that the movable element is arranged unmoved within the third input zone. This means, the proportional control rule for the third zone has the effect that an output signal is generated of such a nature that the moved element of the movement apparatus is not moved when the movable element is located in the third zone. The proportional control of the third input zone and the proportional control of the first input zone can be identical. Alternatively, the control of the third input zone and the proportional control of the first input zone can be different. Such a configuration of the third control rule offers high operating reliability, in particular if the movable element is automatically reset to an input zone having proportional control, e.g. the third and/or the first input zone, by a reset device, after being released by the user. This will be further explained below.

The operating apparatus can comprise a base body which preferably carries the control device and the input device with their input region. The operating apparatus can, moreover, comprise a housing apparatus which at least partially or entirely screens or surrounds the control device and preferably the input device from the surroundings. The operating apparatus can, in addition to the input device, comprise other input facilities for the user, in particular one or more buttons and/or controllers, and/or a keyboard, and/or a display apparatus such as a display screen and/or a touchscreen. The operating apparatus can comprise a source of energy, in particular a battery, or a cable for the external supply of energy, as well as, if appropriate, a power supply unit. The operating apparatus preferably has an interface apparatus that serves to pass the output signal to the movement apparatus of an external positioning apparatus. This interface apparatus is preferably connected by cables, but can also be wireless. Preferably the interface apparatus comprises a plurality of mutually isolated electrical lines, i.e. cables. Preferably here two cables can be connected for the DC control of each of any stepper motors of the movement apparatus, in order to control and/or to regulate the position and speed of a stepper motor.

The electrical control device can be arranged on the base body and/or in the housing apparatus, or can be arranged outside the base body and/or the housing apparatus, but preferably in any case can have a signal connection to the input device.

The control device is preferably constructed in such a way that, according to the method of the invention, the output signal is generated depending on the input signal, in particular making use of suitable computer data, in particular of executable program code, as will be explained. The computer data is preferably used by an electrical control device of operating apparatus, in particular the operating apparatus according to the invention, in order to perform the method according to the invention.

Preferably the electrical control device according to the invention comprises a computing facility for processing digital data, preferably a microprocessor. The control device is preferably programmable, and preferably comprises a programmable computing facility. Preferably the control device has a memory apparatus for the permanent and/or volatile storage of data, preferably furthermore a program memory for the permanent storage of computer data, in particular of an executable program code. The program memory contains the computer data and/or the executable program code. The program memory can, for example, be a Flash memory or an EEPROM. The executable program code can be held in a firmware that is a part of the operating apparatus.

The computer data, in particular the executable program code, are/is preferably designed to generate the output signal depending on the input signal according to the method of the invention. The computer data, in particular the executable program code, are/is preferably designed to generate a first output signal on the basis of the input signal according to the first control rule when the movable element is located in the first input zone. The computer data, in particular the executable program code, are/is preferably designed to generate a second output signal on the basis of the input signal according to the second control rule when the movable element is located in the second input zone. The computer data, in particular the executable program code, are/is preferably designed to generate a third output signal on the basis of the input signal according to the third control rule when the movable element is located in the third input zone.

The control device preferably comprises a drive controller which preferably is designed to regulate at least one drive of the movement apparatus. The drive controller is preferably controlled by a second input signal which preferably was determined by the control device and which contains the values for the positioning and/or speed and/or acceleration of at least one drive of the movement apparatus. The drive controller then generates the output signal of the control device through which the movement apparatus can be controlled. The drive controller can also be provided outside the control device, in particular as a part of the operating apparatus, or outside that. In this case the output signal generated by the control device is the input signal for the drive controller, which in turn generates the second output signal for driving the movement apparatus. In this case again, the movement apparatus can thus be controlled by the output signal of the control device.

The drive controller is preferably designed to control the at least one drive in such a way that it adopts the desired operating state, i.e. that it maintains the desired position and/or speed and/or acceleration. For this purpose the drive controller can comprise means of control in order to change the drive from a current operating state into the desired operating state in a controlled or regulated manner, in order to prevent jerky loading of the drive and the development of vibration. Drive controllers for stepper motors and so forth are, for example, known and are commercially available.

The movement apparatus can comprise at least one drive. The drive can be a motor, in particular an electrically operated motor, preferably a linear motor, preferably a stepper motor which preferably is operated by DC power. The drive can, however, also comprise a hydraulic or pneumatic actuator, or a piezoelectric actuator. The moved element can be moved by the drive. The moved element can be a single component, such as a tool holder, or can be an assembly with multiple components, for instance having a movable slide element, and/or holding equipment for holding a tool holder, in particular a capillary holder, and/or fastening equipment for connecting such components together and so forth.

The movement apparatus can be controlled by the output signal. The movement apparatus is however not a part of the operating apparatus of the invention. If the movement apparatus is connected to the operating apparatus through an interface apparatus, this makes it possible for the movement apparatus to be controlled by the output signal of the control device. The movement apparatus and the operating apparatus are then connected by signals.

The control device can also be designed to generate at least one output signal. The control device can, moreover, also be designed to generate at least two output signals, each of which is designed to control a movement apparatus which, in particular, may have the same construction or may have different constructions. The control device can thus for example be developed further in such a way that the user, via a user interface of the operating apparatus, e.g. a keyboard, a button or a switch, selects the desired operating apparatus that is to be controlled and/or whose output signal is to be generated. The minimum of one or two movement apparatus can be connected permanently to the operating apparatus, or can be connected via signals, or can be connectable when required.

Connected via signals means that information can be exchanged in some technical manner, e.g. by being wired together, e.g. through cabling, or wirelessly, e.g. via a radio connection, preferably through an electrical line, or through optical transmission or some other transmission technology. For example, the input device and the control device are connected by signals, e.g. via cabling or via a wireless data interface, such as a radio connection, so that the input signals created by the user can be transmitted to the control device.

A micropositioning apparatus according to the invention comprises the operating apparatus according to the invention and furthermore comprises the movement apparatus.

The micropositioning apparatus can be a part of micromanipulator equipment according to the invention, which preferably comprises a tool holder, in particular a capillary holder.

The input device can be a joystick apparatus. This comprises a joystick lever. Preferably the movable element is attached to its end that faces the operating apparatus. The movable element can comprise a joystick lever, or can be a joystick lever, or can be a point on or a section of the joystick lever. The joystick lever is preferably mounted in the input device in such a way that it can pivot around a fulcrum.

The input region can be a solid angle region or may comprise one or more solid angle regions within which the joystick lever can pivot. The various input zones can then be different partial regions of the solid angle region, i.e. themselves also solid angle regions. The solid angle region can, for example, be adequately defined by a first angle and a second angle. The first angle $\beta$ can be measured in the x-z plane of a Cartesian coordinate system, and the second angle $\chi$ can be measured in the y-z plane of the coordinate system. This is preferably implemented by means of a sensor apparatus in the input device which comprises at least one sensor, preferably precisely or at least two sensors, in particular distance sensors. The sensor or distance sensor is preferably a non-contacting sensor, preferably a Hall sensor or an optical sensor. An optical sensor can, in particular, also be constructed as a photocell arrangement. The coordinate system can be such that the joystick lever, which can move with rotational symmetry with respect to a z-axis, has a zero position, in which the joystick is aligned parallel to the z-axis. The x-y plane is here perpendicular to the z-axis. The fulcrum of the joystick lever is preferably the zero point of the coordinate system.

The input device can also have an input region in the form of a strip or other surface, in particular a planar input region which, for example, is the case with an input device with a sliding element or a touch-sensitive surface, for example on a touchpad or touchscreen, where the position value is determined by means, for example, of a capacitively operating sensor apparatus. The movable element can here be the users fingertip. The input device can, furthermore, also comprise a trackball, an operating rocker that can rock around one or more axes, or a sliding element that can be pushed along in one or more directions. A commercially available input device can be used as the input device, provided that it allows the position value to be determined and that the input signal for the control device can be generated.

The input device is a part of the operating apparatus. The input device is preferably a physical part of the operating apparatus, and is arranged in particular on a base body of the operating apparatus, and in particular at least partially inside a housing apparatus of the operating apparatus that comprises the control device. The input device can, however, also be arranged outside a housing apparatus of the operating apparatus that comprises the control device, inasmuch as the input device has a signal connection to the control device in order to pass on the input signal to the control device.

The joystick lever is preferably suspended from gimbals, so that it can pivot around the z-axis with rotational symmetry. For this purpose the gimbal suspension has two pivoting axes, perpendicular to one another, which can be parallel to the x and y-axes. The joystick lever preferably comprises a boom section that is arranged at the lower end of the joystick lever, thus pointing in the direction of the lower half-space of the coordinate system, thereby pointing in the region of points with negative z values. To determine the position of two solid angles, preferably at least two sensors are arranged at a distance from one another, preferably in the lower region of the half space. A first sensor can be arranged underneath the boom section on the z-axis, while a second sensor can be arranged offset from the z-axis, preferably at the level of the fulcrum or underneath it.

The joystick lever can, in particular at the lower end of the boom section, have an interacting element on the boom section which interacts with a sensor in order to determine a position value. An interacting element can, moreover, be arranged and/or attached at the gimbal suspension. The interacting element can be a magnetic element, and in particular can comprise a permanent magnet. Its distance from a Hall sensor can be determined by the said sensor, so that, for example, a solid angle can be detected. The interacting element can also be a transmitter or reflector, or may comprise an aperture apparatus in order, for example, to act as an optical photocell.

Preferably the operating apparatus comprises a sensor apparatus. Preferably this is a part of the input device. Preferably this comprises a number N_sens of sensors which are suitable for detecting the position or change in position, where N_sens>=1. Preferably, N_sens=2, since this is particularly appropriate and economical for the facilitation of the preferred detection of two location parameters, e.g. two angles or two distances. In the case of a one-dimensional movement of the movable element, one sensor is preferably used, in the case of a two-dimensional movement, two sensors are preferably used, and in the case of a three-dimensional movement, three sensors are preferably used. Preferably twice the number of sensors are used in each case, in order to achieve better precision.

A sensor is preferably a non-contacting sensor, preferably a distance sensor. Preferably the sensor is a Hall sensor. The sensor can, furthermore, be an optical sensor, and can, for example, comprise at least one LED which can emit in the visible spectrum or in the infrared spectrum. An optical sensor apparatus can comprise a photocell apparatus in order to determine the position value.

A sensor can, however, also have a contacting principle of operation, and can, for example, comprise a potentiometer.

Preferably the operating apparatus comprises a signal device that is designed to indicate to the user the change when the movable element changes its position between two input zones. As a result, the control of a movement of a movement apparatus is more convenient, or even intuitive.

Preferably the signal device is designed to give the user a tactile and/or optical and/or acoustic signal when this change between two different input zones occurs. The tactile perception can in particular be the perception of an opposing force, in particular of an increased opposing force.

Preferably the signal device is designed to give the tactile signal to the user when the change between a dead zone and the second input zone occurs. In particular when the first input zone is used for proportional control and the second input zone for dynamic control, the user is informed or warned on entering into the "fast movement mode" according to dynamic control.

Preferably an apparatus for force feedback is provided and is designed to supply a changeable opposing force to the user, depending on the position and direction of movement of the movable element, when the user changes the position of the movable element. This principle, known as "force feedback", permits intuitive control, in which a parameter that is to be controlled also determines the magnitude of the feedback force. This parameter which is to be controlled can, for example, be the relative position of the movable element within a second input region, which preferably is proportional to the speed of a drive of the movement apparatus. As a result this control is intuitive. The apparatus for force feedback can comprise a sliding guide element which can have a cutout.

Preferably the apparatus for force feedback serves as this signal device, generating a tactile signal that indicates the change of zone to the user.

Preferably, the operating device has a reset device. Preferably the apparatus for force feedback also serves as reset device, to the reset device is configured to return the movable element to an initial position, in particular by means of the opposing force. For this purpose the input device preferably, or the reset device, respectively, comprises a spring device that effectuates this repositioning. Said initial position can be, preferably, within the first input zone, or in the third input zone or on the boundary between the first and third input zone.

Preferably the reset device and/or the apparatus for force feedback comprises a sliding guide element movably spring-mounted by the spring device around the movable element.

The sliding guide element preferably has the form of a plate, in particular the form of a disc, in particular the form of a circular ring. Preferably it has a cutout that serves as a sliding guide. The inner face of the sliding guide element, which is adjacent to the cutout, in particular an inner edge of the sliding guide element, is formed here as a guide track and/or slide track for the movable element and/or for an operating element of the operating apparatus that is preferably provided, when the movable element or the operating element contacts this inner face. The sliding guide element is supported movably with respect to the input device, and is in particular moved out of a zero position when the movable element exercises a force on this inner face.

The outer contour of the cutout of the sliding guide element preferably has the same shape and/or size as the contour that forms the transition from the first input zone into the second or third input zone or from the third input zone into the second input zone, which thus in any case constitutes a zone boundary. In this way the change in the control rule can be coupled to the signal generation by the signal device and/or the force feedback and/or the repositioning function. In particular, the signal can initiate or halt the force feedback or the repositioning precisely when the user moves the movable element over the said zone boundary. Thus if the user completes, for example, the transition between the proportional zone (or the dead zone) into the dynamic zone, he will, for example, come against the inner face of the sliding guide with the operating lever of the joystick, which will signal the transition to him. With further deflection into the dynamic zone, which is equivalent to an increase in the drive speed in the movement apparatus, the user perceives force through the spring device which is opposed to the force with which the user is deflecting the lever. If the speed of the drive is largely proportional to the opposing force generated by the spring device, then the force feedback is particularly informative, and results in more intuitive control of the operating apparatus. The contour of the zone boundary and the outer contour can, however, also be formed differently.

The outer contour of the cutout of the sliding guide element preferably has the same shape and/or size as the contour, i.e. zone boundary, which forms the transition from the first input zone to the third input zone. This offers the advantage that, in case that the sliding guide element is configured to be a part of the reset device, the movable element is safely moved out from the second input zone, and in particular is set into the third and/or first input zone or at least to the boundary between the third and first zone, in case that the user releases the movable element, while it is arranged within the second input zone. The advantage is provided in particular in the case when the outer contour of the cutout of the guiding slide element has a slight deviation with respect to the shape and/or size compared to the contour, which forms the transition from the first input zone to the third input zone, or if the zero position of the sliding guide element changes during the lifetime of the operating apparatus due to degeneration, or in the case that by other reasons there is no perfect match between the outer contour of the cutout of the guiding slide element and the boundary of the first and third zone. In each case it can be provided that the movable element is not any more arranged within the second input zone after being released. In this context it is obvious that the size and/or shape of the third input zone is configured such that said deviations do not exceed beyond the third input zone.

For example, in case that the second control rule of the second input zone is a dynamic control and the first control rule of the first input zone is a proportional control, and in particular if also the third control rule of the third input zone is a proportional control or in case the third zone is a dead zone, then the aforementioned configuration guarantees that the moved element will not move further, if the movable element is released—apart from a possible short deceleration phase, by having the sliding guide element being reset to the third and/or first input zone. The advantage becomes evident, in particular, in the case of using the operating device for the manipulation of living cells, in particular the manipulation of living human oocytes in the context of ICSI. In such a context it is particularly important that the moved element, being a capillary, is not further moved after the movable element, being a joystick lever, has been released by the user within the second zone. This way, the risk of damaging the valuable oocyte or damaging of the micropositioning device can be reduced.

The sprung sliding guide element preferably has a defined zero position that is defined by the equilibrium of the spring elements of the spring device. Preferably the spring device can be adjusted by a means of adjustment in order to adjust the zero position. Preferably the z-axis, which passes through the fulcrum of the joystick lever, passes through the geometrical centre of the cutout of the sliding guide element when in the zero position. The joystick lever, when in its zero position, is preferably parallel to the z-axis, in particular so that the z-axis is congruous with the central axis through the joystick lever. The joystick lever is preferably attached in such a way that its position within the input zone does not change provided it is not pushed by the user or by a repositioning apparatus.

The input device can be constructed in such a way that the sliding guide element can be exchanged. The operating apparatus can be constructed in such a way that the contour of the zone boundary can be selected by the user, and in particular can be matched to the outer contour of the cutout of the sliding guide element. Use of the operating apparatus is made more flexible in this way.

The outer contour of the cutout of the sliding guide element and the contour of the zone boundary are preferably both circular in shape. As a result, the operating apparatus is particularly intuitive to operate, since there is no preferred direction. The outer contour and the contour of the zone boundary can, however, also have other forms, of which a few examples are shown in FIGS. 6a and 6b. One form of the contour that has a region displaced towards the inside, and is thus partially heart-shaped, as is shown for example in FIG. 6b, can be advantageous for certain particular applications of the operating apparatus. It is thus for example possible during cell manipulation, in particular during ICSI, for the capillary to be moved rapidly by the movement apparatus under dynamic control through a relatively small deflection of the joystick lever or of the movable element in the direction of the arrow A, and then to perform a movement by means of proportional control in the direction of arrow B.

Preferably the first control rule generates proportional control of the movement of the moved element of the movement apparatus depending on the position value. Preferably the second control rule generates dynamic control of the movement of the moved element of the movement apparatus depending on the position value.

In a particularly preferable embodiment, the input region has a dead zone located between the first and the second input zones, and the first control rule effects a proportional control of the movement of the moved element of the movement apparatus depending on the position value, and the second control rule effects a dynamic control of the movement of the moved element of the movement apparatus depending on the position value. This configuration achieves an intuitive operation of the operating apparatus. The user can move the moved element in dynamic mode rapidly, and, by means of the dead zone, can reliably change into proportionality mode in order to perform a fine adjustment of the position of the moved element of the movement apparatus.

The invention relates furthermore to a method for the generation of an output signal, in particular in the electrical control device of an operating apparatus, in particular the operating apparatus according to the invention, for the control of the movement apparatus, in particular of the movement apparatus of a micromanipulator for manipulating biological cells, in which by means of the input device of operating apparatus, an electrical signal is generated which serves as the input signal for an electrical control device, where an output signal is generated by the electrical control device depending on the input signal, with which the movement of a movement apparatus can be controlled, where this input region has a first input zone, and where the output signal is generated by the control device according to a first control rule depending on the input signal when the movable element is arranged in the first input zone, and where the input region has a second input zone, and where the output signal is generated by the control device according to a second control rule depending on the input signal when the movable element is arranged in the second input zone.

The invention furthermore relates to computer data, in particular an executable program code, that executes the steps of the method according to the invention. The invention furthermore relates to a data carrier, e.g. a compact disc or a Flash memory, that contains the computer data, in particular the executable program code, which permits execution of the method according to the invention in an electrical control device.

Further preferable embodiments of the method according to the invention emerge from the description of the operating apparatus according to the invention.

Further preferable embodiments of the operating apparatus according to the invention and of the method according to the invention emerge from the following description of the exemplary embodiments in connection with the figures and their description. The same components of the exemplary embodiments are generally identified by the same reference numbers, unless something other is described or emerges from the context. They show:

FIG. 1a schematically shows an exemplary embodiment of the operating apparatus according to the invention, and a movement apparatus controlled by it.

FIG. 1b shows a workplace for cellular biology, that comprises various devices and the operating apparatus from FIG. 1a.

FIG. 2a schematically shows a section of the input device according to an exemplary embodiment of the operating apparatus according to the invention, with a part of the sliding guide element, along with the movable element and the input region.

FIG. 2b schematically shows the input region with the first and second input zones, as well as the dead zone, along with the movable element according to one exemplary embodiment of the operating apparatus according to the invention.

FIG. 2c shows the input region from FIGS. 2a and 2b, with movement of the movable element in the first zone.

FIG. 2d shows the input region from FIG. 2c, with movement of the movable element from the first zone into the dead zone.

FIG. 2e shows the input region from FIG. 2d, with the position of the movable element in the dead zone.

FIG. 2f shows the input region from FIG. 2e, on which the input device and the sliding guide element in the zero position are superimposed.

FIG. 2g shows the input region from FIGS. 2e and 2f, with movement of the movable element from the dead zone into the second zone.

FIG. 2h shows the input region from FIG. 2g, on which the input device and the sliding guide element in a deflected position are superimposed.

Figure 5A:
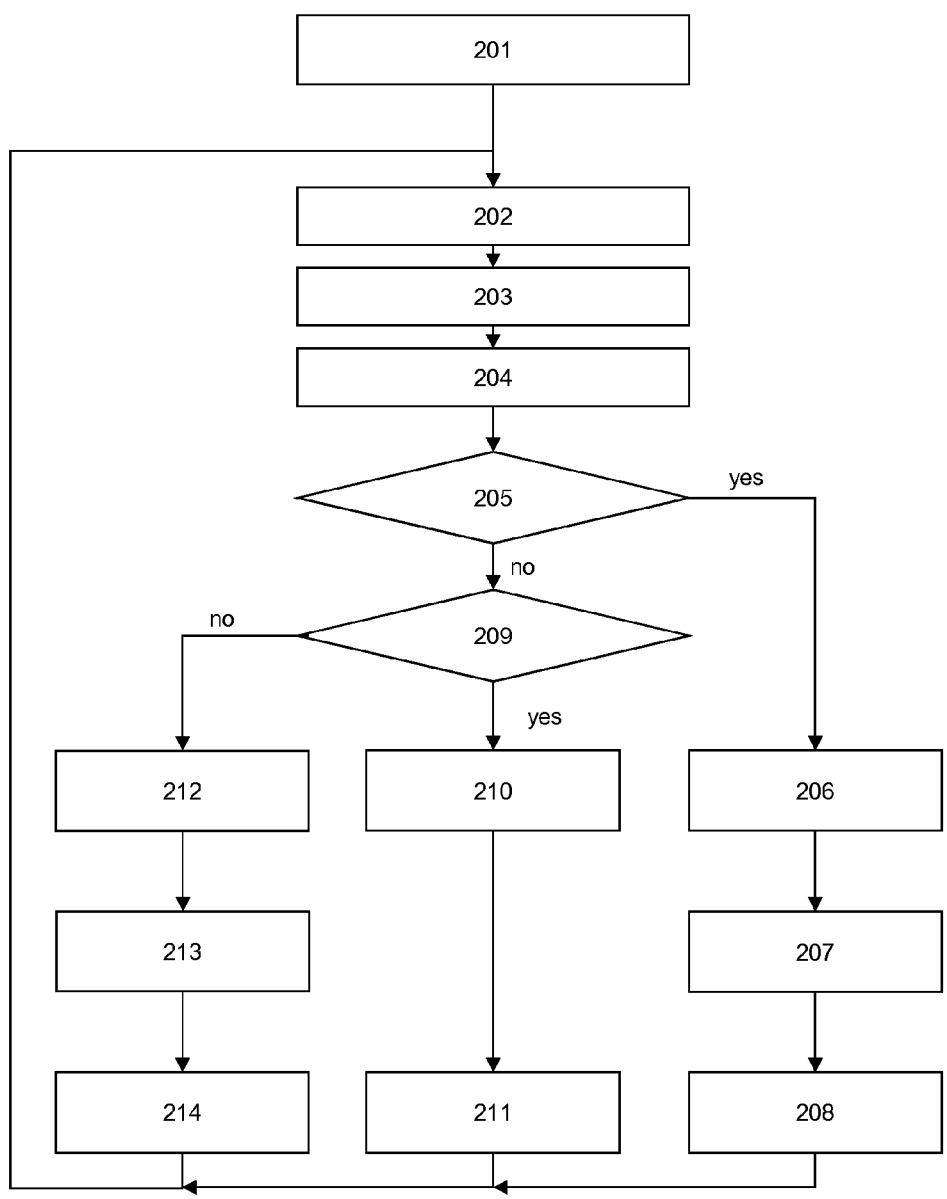

FIG. 5a schematically shows the steps of the method according to an exemplary embodiment of the method according to the invention.

Figure 5B:
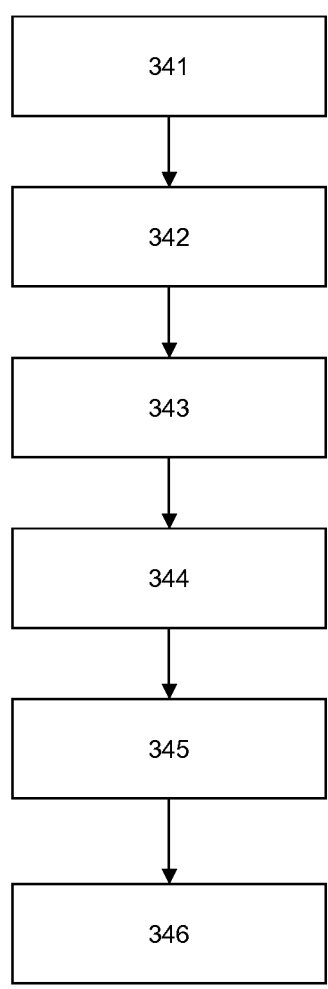

FIG. 5b shows schematically the steps of the method according to the dynamic control of the method in FIG. 5a.

Figure 5C:
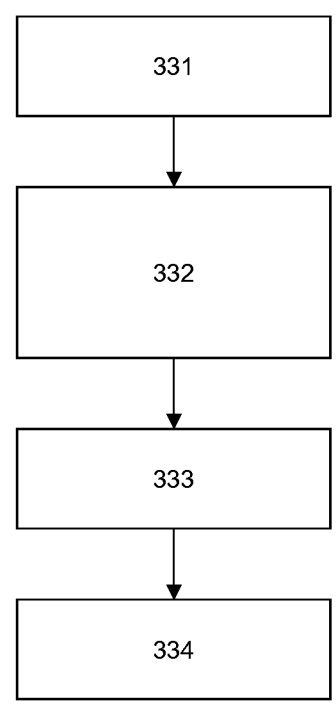

FIG. 5c shows schematically the steps of the method according to the proportional control of the method in FIG. 5a.

Figure 6A:
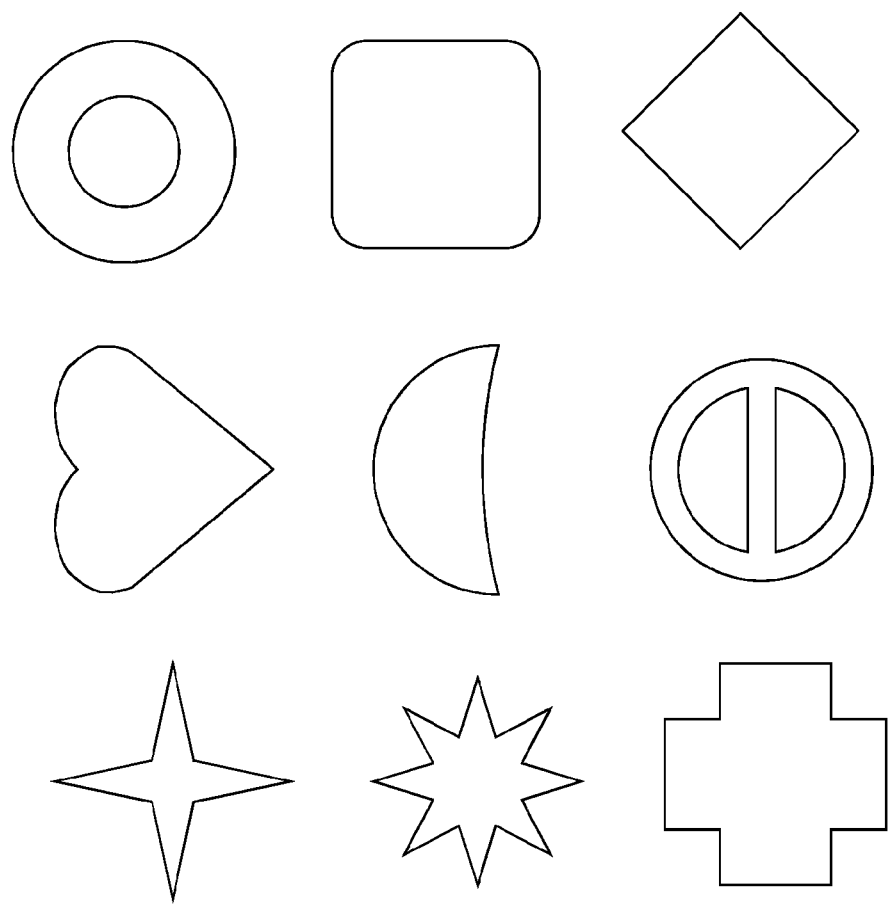
Figure 6B:
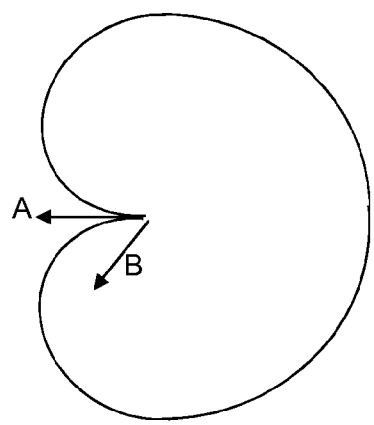

FIG. 6a and FIG. 6b show examples for the zone boundary and for the outer contour of the cutout of a sliding guide element of operating apparatus according to the invention.

Figure 7A:
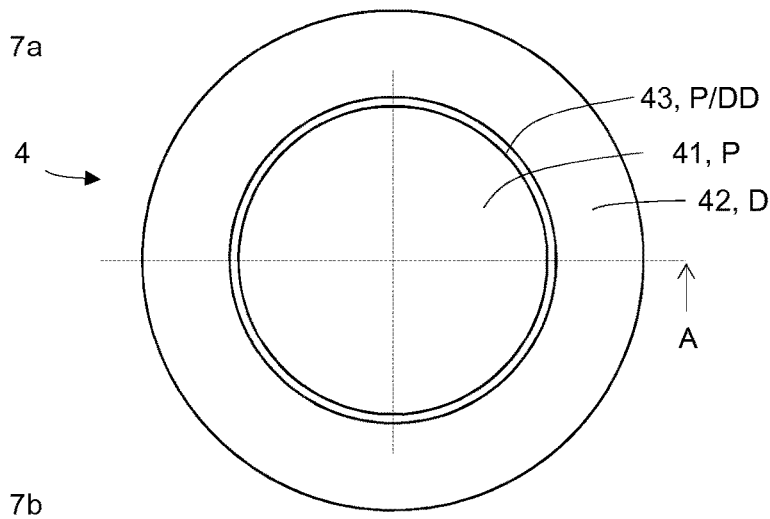

FIG. 7a shows the input area having three input zones according to an embodiment of the operating apparatus according to the invention.

Figure 7B:
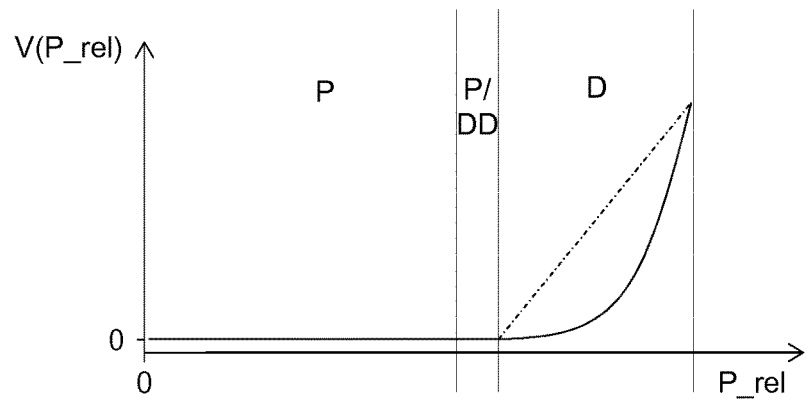

FIG. 7b shows a diagram with a Cartesian coordinate system, whose point of origin corresponds to the center point of the input region shown in FIG. 7a, and whose x-axis refers to the corresponds to the position value P_rel along the line A shown in FIG. 7a, wherein the velocity v(P_rel) depending on P_rel is schematically shown as an example in the input zones P, P/DD, D.

Figure 7C:
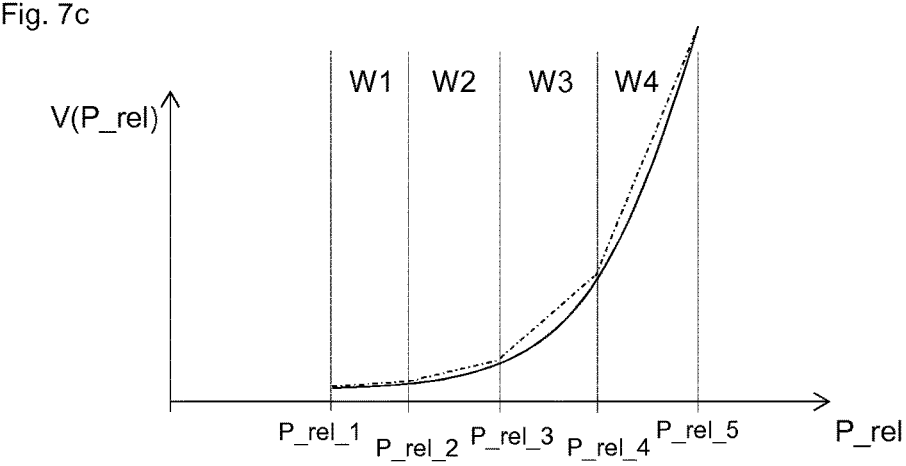

FIG. 7c schematically shows the velocity v(P_rel) associated with the outer, second input zone D shown in FIG. 7b, having an alternative realization of the non-linear course of the function v(P_rel).

Figure 8A:
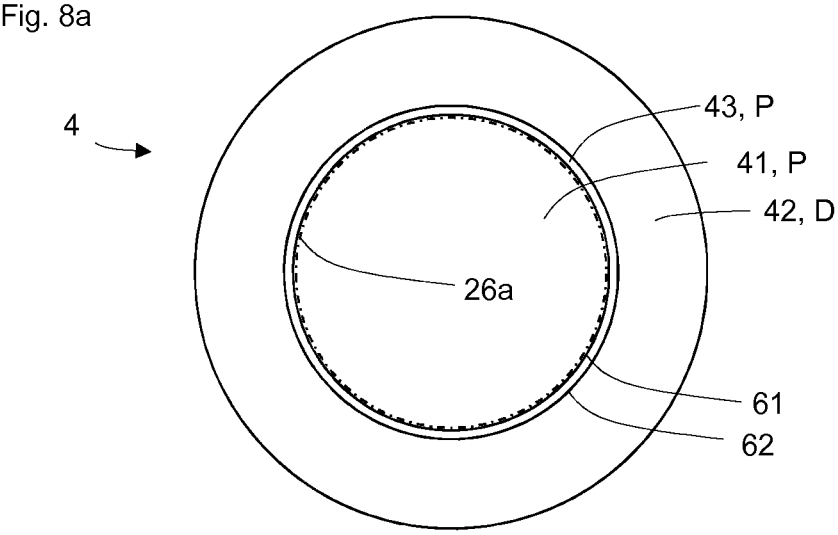

FIG. 8a shows the input area with three input zones according to an embodiment of the operating apparatus according to the invention, wherein the sliding guide element is arranged in a first arrangement of a zero position.

Figure 8B:
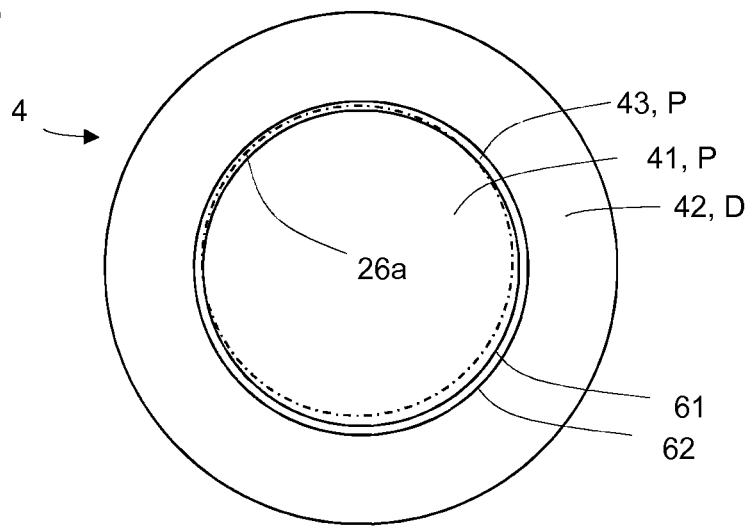

FIG. 8b shows the input area from FIG. 8a, wherein the sliding guide element is arranged in a second arrangement of a zero position.

Figure 1A:
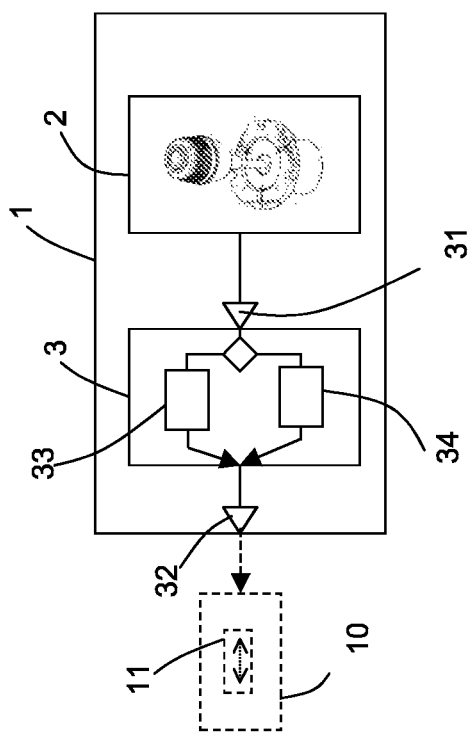

FIG. 1 schematically shows the operating apparatus 1. The operating apparatus is laboratory equipment for controlling the movement apparatus 10 of a micropositioning apparatus. This also has a capillary holder joined to the movement apparatus. A capillary is attached to this, and operates as a tool for the manipulation of living cells. The micropositioning apparatus is constructed in the manner of micromanipulator equipment. The movements of the capillary 51 (see FIGS. 4a, 4b, 4c) in the range between millimeters and micrometers, that are generated by the operator by means of the operating apparatus 1, can be observed at various resolutions through an inverted microscope. The operating apparatus according to the invention permits, in particular, the intuitive, single-handed control of the movement, so that one of the operators hands remains free to operate the microscope.

Figure 1B:
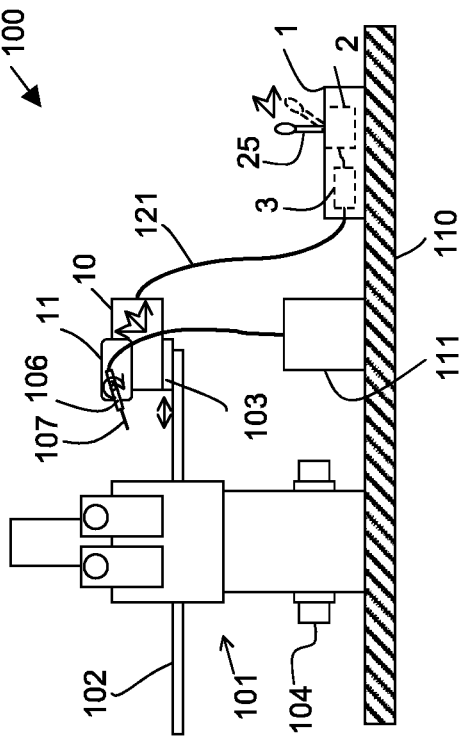

FIG. 1b shows a workplace 100 for cellular biology, that comprises various devices and the operating apparatus 1. The workplace comprises a microscope 101, the piezoelectric microactuator 106, constructed as a capillary holder 106, with its electrical controller 111, and the micropositioning apparatus (1, 10) which incorporates the operating apparatus 1 and the movement apparatus 10 that is connected to it via cabling 121, said movement apparatus having, as the moved element 11, holding equipment 11 for holding a tool holder, which here is the capillary holder 106 with capillary 107. The movement apparatus 10 comprises three stepper motors (not illustrated), by means of which the moved element 11 can be moved along the three axes x', y', z' of a Cartesian coordinate system, controlled by the output signal of the operating apparatus 1 depending on the change in position x, y effected by the user and which can be assigned to the head of the joystick lever 25. The operating apparatus can also be controlled by a rotary knob at the head of the joystick lever, in particular in the z-direction. The devices are arranged on a laboratory bench 110.

In a typical application, for example the performance of ICSI, the operator of this workplace puts, for example, a petri dish with a cell onto the working plate 102 of the microscope 101, which here is inverted, then brings the movement apparatus 10, which can be moved manually by means of a carriage 103, close to the petri dish, then manually moves the capillary holder 106 with the capillary 107 relatively quickly in the direction of the petri dish, in particular until it enters into the nutrient medium that is contained in the petri dish. Through the microscope he now observes the entry of the capillary, which he can still move relatively quickly in the direction of the cell through a relatively large deflection of the joystick, at which stage the operating apparatus automatically applies the control rule for dynamic control. Using the focusing wheel 104 of the microscope he adjusts, with one hand, the optical focus between the tip of the capillary and the cell, in order to observe the distance between the tip of the capillary and the target location on the cell. Close to the cell, a smaller deflection of the joystick generates fine control in the range from, in this case, 50 nm up to 15 μm, where the operating apparatus automatically applies the control rule for proportional control. The proportionality factor c for scaling down the operating movement x, y can be entered by the user at the operating apparatus. In this application it is advantageous that the control of the movement apparatus 10 by means of the operating apparatus 1 proceeds intuitively and conveniently, as will yet be explained below.

The operating apparatus 1 has an input device 2, which in this case is a joystick apparatus 2. This detects the value of the position of the joystick lever, moved within the input region and forming the movable element. The value of the position contains, in the present case, the position of the joystick lever, which is defined by two measured angles, as will yet be explained. The joystick apparatus 2 generates an electrical signal that contains the position value. The electrical signal acts as the input signal 31 for the control device 3. Depending on the position of the joystick lever, the control device 3 generates an output signal according to a first control rule 33 when the joystick lever is located in the first input region. Depending on the position of the joystick lever, the control device 3 generates an output signal according to a second control rule 34 when the joystick lever is located in the second input region.

Figure 3A:
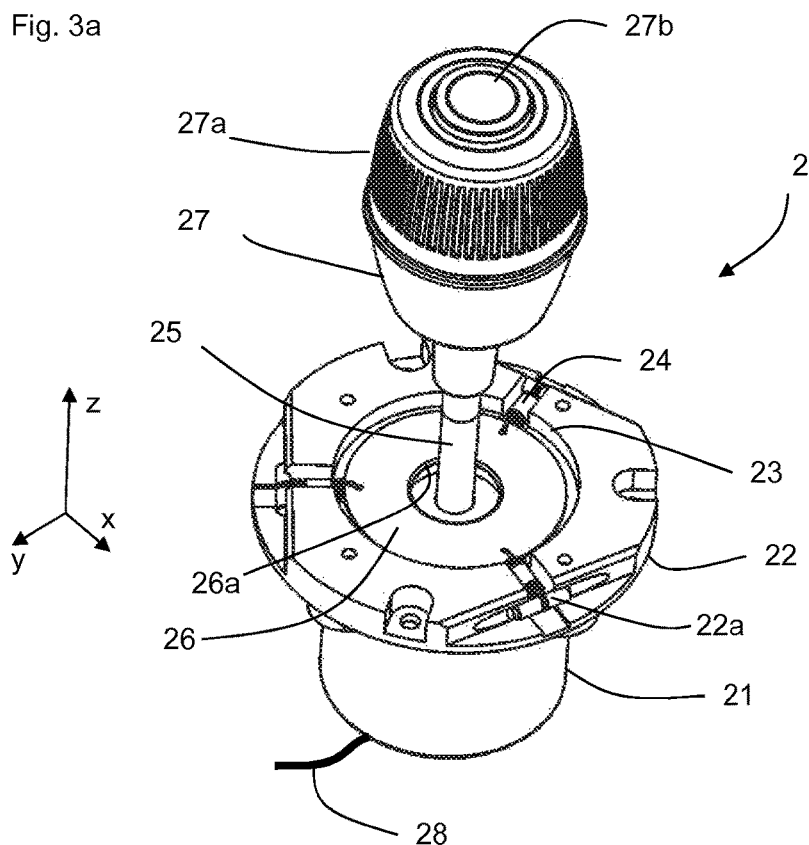
FIG. 3a shows a perspective view of the input device according to one exemplary embodiment of the operating apparatus according to the invention.
Figure 3B:
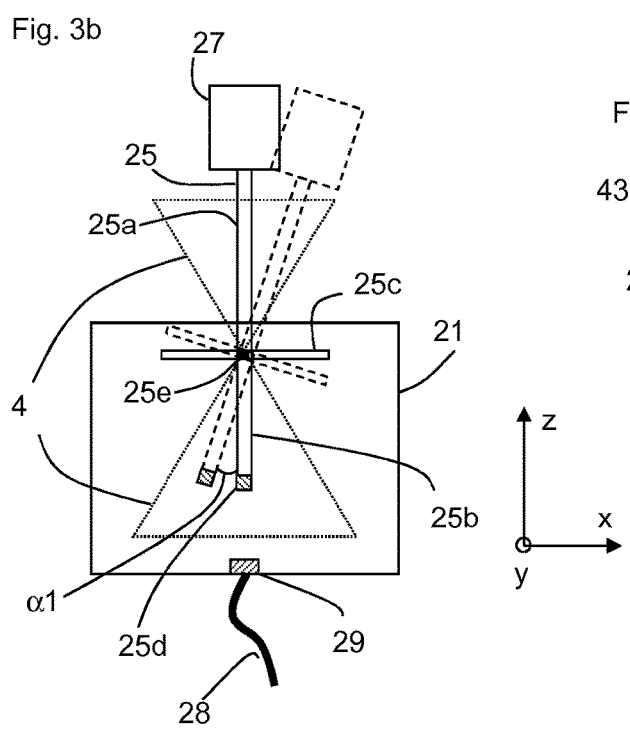
FIG. 3b shows a schematic side view of the input device of FIG. 3a with the input region.
Figure 3C:
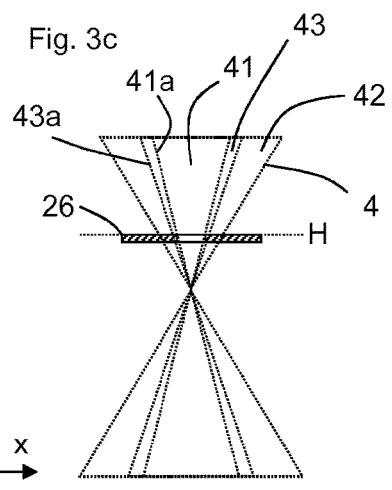
FIG. 3c shows a schematic side view of the input region of FIG. 3b with the first, second and third input zones and the sliding guide element.

The input region 4 is, as is shown in FIGS. 3b and 3c, in the present case, a region of solid angles having the form of a double cone, with two conical solid angle regions which, starting from the fulcrum 25e of the joystick lever, extend upwards and downwards, in the direction of the positive and negative z-axis of a Cartesian coordinate system, and which have a first opening angle α1. In addition, there is the zone boundary 43a, which is formed by the outer surface of two conical solid angle regions with a smaller opening angle α2, and the zone boundary 41a which is formed by the outer surface of two conical solid angle regions with a yet smaller opening angle α3. In other words α1>α2>α3. The first input zone is located inside the zone boundary 41a; the third input region is located between the zone boundary 41a and the zone boundary 43a; and the second input region is located between the zone boundary 43a and the outer surface of the input region 4. If the movable element is considered as the axis of the joystick lever, and the fulcrum 25e as a mathematical point, then the joystick axis always moves within the said zones or on the zone boundaries. The volume of the joystick lever itself then overhangs the zone boundaries.

As is illustrated in FIG. 3a and FIG. 3c, the spring-mounted sliding guide element 26 is arranged parallel to the x-y plane above the fulcrum 25e and at a distance of, for example, about 1 to 3 cm. It is spring-mounted on a frame element 22 by means of three spiral spring elements arranged equidistantly. The spiral spring elements are distributed concentrically around a straight line through the fulcrum 25e and parallel to the z-axis. The spring elements can be adjusted by adjustment means 22a, which are fastened to the frame element 22. In the present case each spring element is joined to a means of adjustment. The means of adjustment allows the tension in a spring element to be increased or decreased.

When in the zero position, the sliding guide element is arranged in such a way that the straight line through the fulcrum 25e and parallel to the z-axis passes precisely through the centre of the cutout 26a which in this case is circular. The inner face of the cutout 26a, which is also reffered to as outer contour of the sliding guide element, and the second input zone are in general preferably formed in exactly such a way that the movable element 25, which here is the joystick lever or its joystick axis, is located precisely on the zone boundary 43a to the second input zone when the movable element is just touching the inner face of the cutout, without deflecting the sliding guide element from its zero position. This is also true when the inner face has a non-circular contour, as is illustrated in FIG. 6a and FIG. 6b.

In FIGS. 2a to 2h, the input region 4 with a first input zone 41, a third input zone 43=dead zone, and second input zone 42 are illustrated at the height H of the sliding guide element in FIG. 3c.

FIG. 2a schematically shows a section of the input device 2 of the operating apparatus 2, with a part of the sliding guide element 26, along with the movable element 5 (=lever 25) and the input region 4. FIG. 2b schematically shows the input region with a first input zone 41 and a second input zone 42, as well as a dead zone 43 and the movable element 5. The movable element 5 is located in the first input zone. In the control device 3 this is associated with a control rule 33 for proportional control of the movement apparatus, so that proportional control results when the movable element is located in the first input zone 41. In FIG. 2b the movable element 5 is not in motion, so that no movement of the movement apparatus is effectuated. The control device 3 recognizes which input zone the movable element is located in, and correspondingly selects the control rule associated with the input zone.

FIG. 2c shows the input region from FIGS. 2a and 2b, with movement of the movable element in the first zone. A change in position dP2 of the movement apparatus, proportional to the change in position dP1 of the movable element 5 results, i.e. dP2~dP1 or dP2=c*dP1, where c is a number smaller than 1. This means that the movement is scaled down, so permitting fine control. The factor c can be set by the user at the operating apparatus, e.g. to a value between $10^{-5}$ and 1.

FIG. 2d shows the input region from FIG. 2c, with movement of the movable element from the first zone into the dead zone. The appropriate control rule is applied when the movable element is moved or positioned in the dead zone. Consequently, no movement of the movement apparatus is generated when the movable element is located in the dead zone. FIG. 2e shows the input region from FIG. 2d, with the position of the movable element in the dead zone.

FIG. 2f shows the input region from FIG. 2e, on which the input device and the sliding guide element in the zero position are superimposed.

FIG. 2g shows the input region from FIGS. 2e and 2f, with movement of the movable element from the dead zone 43 into the second zone 42. The movable element 5 is then located in the second input zone. In the control device 3 this is associated with a control rule 34 for dynamic control of the movement apparatus, so that dynamic control results when the movable element is located in the second input zone 42. This means that the speed v maintained by the movement apparatus depends on the relative position P_rel adopted by the movable element, which is measured, in FIG. 2g, starting from the zone boundary 43a between the third 43 and second 42 input zones in a radially outwards direction. This means that v is preferably a function of P_rel, i.e. v=v(P_rel).

FIG. 2h shows the input region from FIG. 2g, on which the input device and the sliding guide element 26 in a deflected position are superimposed. The deflection is made against the force of the spring device 24. The spring device, with the sliding guide element, performs three functions, each of which can also be implemented in other ways. As a result of the deflection, an opposing force is generated, which works to oppose the deflection force applied by the user. This provides a tactile signal to the user of the transition from the third into the second input zone. A change in the position of the movable element within the second input zone moreover generates a force feedback, i.e. the force that the user must apply changes with P_rel. The user thus receives tactile information about the magnitude of the speed v with which the movement apparatus is moving. As a third function, the spring device acts with the sliding guide element so that the movable element, i.e. the joystick lever 25, is moved back into the dead zone as soon as the user releases the lever. As a result operation is secure and, moreover, intuitive.

Figure 4A:
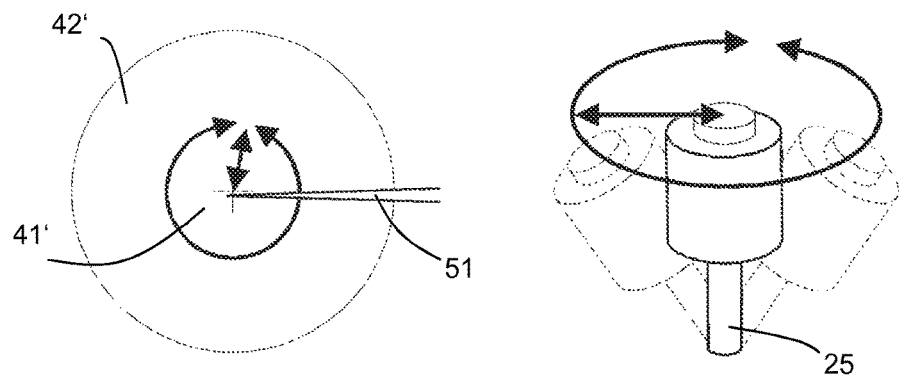
FIG. 4a shows, on the left, the input region, with, superimposed upon it, the movement of the moved element generated by operating apparatus according to the invention operating in proportional mode, and, on the right, shows the maximum possible deflection of the operating lever of the input device of the operating apparatus.
Figure 4B:
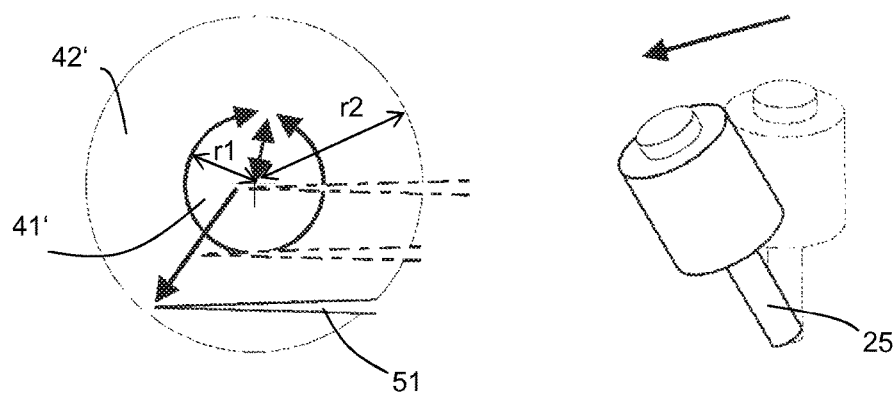
FIG. 4b shows, on the left, the input region, with, superimposed upon it, the movement of the moved element generated by operating according to the invention equipment with the change from proportional mode to dynamic mode, and, on the right, shows the corresponding deflection of the operating lever of the input device of the operating apparatus.
Figure 4C:
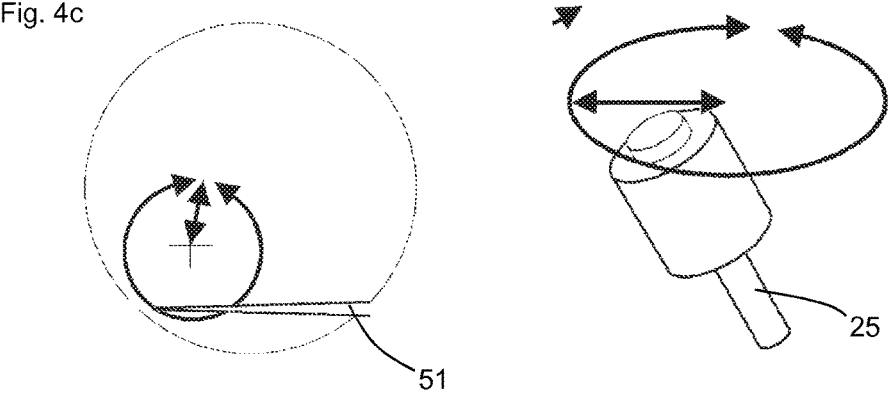
FIG. 4c shows, on the left, the input region, with, superimposed upon it, the movement of the moved element generated by operating apparatus according to the invention operating in dynamic mode, and, on the right, shows the deflection of the operating lever of the input device of the operating apparatus.

FIG. 4a shows on the left the input region 4', with, superimposed upon it, the movement of the moved element, that is the tool or capillary 51, generated by operating apparatus according to the invention operating in proportional mode, and on the right shows the maximum possible deflection of the operating lever 25 of the input device of the operating apparatus. FIG. 4b shows on the left the circular input region with the first circular input zone 41' with an outer radius r1 and with the second input zone 42' with the second outer radius r2>r1, with, superimposed upon it, the movement of the moved element generated by operating apparatus according to the invention with the change from proportional mode to dynamic mode, and on the right shows the corresponding deflection of the operating lever of the input device of the operating apparatus. FIG. 4c shows on the left the input region, with, superimposed upon it, the movement of the moved element generated by operating apparatus according to the invention operating in dynamic mode, and on the right shows the deflection of the operating lever of the input device of the operating apparatus, which experiences an opposing force from the sprung sliding guide element.

FIG. 3a shows a perspective view of the input device 2 according to the operating apparatus 1. The frame element 22 is fastened to a hollow, cylindrical base element 21. The joystick lever 25 is suspended on gimbals from the base element 21 such that it can pivot about the fulcrum 25e (FIG. 3b). The joystick lever is suspended in such a way that it is not deflected by gravity when it is located within the first input zone 41.

The joystick lever has a lever head 27. This, in the present case, has a rotary knob 27a, whose position is acquired by a measuring apparatus of the lever head and can be transmitted with the position value over the cabling 28 to the control device 3. The control device can assign a desired function to the rotary knob according to the user's choice or have a fixed function. Typically, a z-movement, i.e. a height, of the movement apparatus is controlled with the rotary knob. In the present case the lever head 27 moreover comprises the pushbutton 27b. Its position (pressed/not pressed) can be acquired by a measuring apparatus of the lever head and can be transmitted with the position value over the cabling 28 to the control device 3.

The control device can assign a desired function to the pushbutton 27b according to the user's choice or have a fixed function. A typical function is, for example, the dead function, which corresponds to the control rule of the dead zone. In other words, even when the movable element is moved, regardless of the input zone, no movement is transmitted to the movement apparatus for as long as the pushbutton 27b is pressed. This permits a follow-up of the joystick within the proportionality zone 41, and also immediately stops the movement when the movable element is located in the dynamic zone 42. The pushbutton 27b and the rotary knob 27a however are in particular optional.

FIG. 3b shows a schematic side view of the input device 2 of FIG. 3a with the input region 4. The input device 2 comprises a sensor apparatus which, in the present case, comprises two Hall sensors 29 (only one is illustrated). The position of the joystick can be detected unambiguously by the sensor apparatus. The lowest end section of the joystick lever 25 comprises the permanent magnet 25d, whose distance from the Hall sensor 29 can be detected by the Hall sensor 29. In this way the solid angle $\alpha 1$, which is measured in the x-z plane of the Cartesian coordinate system, can be detected. A second Hall sensor (not illustrated) is attached to the boom 25c of the gimbal suspension of the joystick lever 25. In this way the solid angle $\alpha 2$, which is measured in the y-z plane of the Cartesian coordinate system, can be detected. The Hall sensors output signals which represent the solid angles $\alpha 1$ and $\alpha 2$. The input device converts the solid angle values into virtual x-y values of the input device. Within the first input zone 41 these, multiplied by the desired factor c<1, determine the change in position dP2 (i.e. dX2 and dY2) of the movement apparatus according to proportional control, and, within the second input zone 42, the speed v=v(P_rel) of the movement apparatus according to dynamic control.

The control device comprises a programmable microprocessor which runs an executable program code in order to generate the output signal 32. The program code is permanently stored in a program memory of the control device. The program code decides, on the basis of the input signal, which it regularly and repeatedly detects, preferably every 10 ms, in which input zone the movable element 5 (25) is located. Depending on the result, it applies a first control rule in order to generate an output signal with which proportional control of the movement apparatus is effectuated. Or it applies a second control rule in order to generate an output signal with which dynamic control of the movement apparatus is effectuated. Or it applies a third control rule in order to generate an output signal with which no change in the position of the movement apparatus is effectuated.

FIG. 5a schematically shows the steps of the method according to an exemplary embodiment of the method according to the invention.

In step 201, the values for R1, which is the boundary between the first input zone and the third input zone, and R2, which is the boundary between the third input zone and the second input zone, are specified, and are preferably stored permanently in the control device. In the case of the circular sliding guide, the boundary is determined by the distance R between the centre of the cutout and the current position of the movable element. The first input zone 41 is assigned to the proportional control, and is also referred to as the proportional zone. The second input zone 42 is assigned to the dynamic control, and is also referred to as the dynamic zone. In the third input zone 43, the movement of the movable element does not cause any activity of a movement apparatus associated with the operating apparatus, and this is referred to as the dead zone.

The following step 202 provides for a waiting time of 10 ms. The following step 203 provides for: querying the joystick position in the solid angles α1, α2, querying the motor position X2, Y2 of the two stepper motors of the movement apparatus. The following step 204 provides for: conversion of the joystick position α1, α2 into polar coordinates, the radius R and the angle within the x-y plane. The following step 205 provides for: checking whether the radius R is smaller than the radius R1. If true ("yes"), the proportional control is applied, 206. If not true ("no"), a further query 209 follows.

In order to apply the proportional control, the output signal 32 is generated, 207, according to a control rule for the proportional control that depends on α1, α2. This is done with the help of a drive controller (not illustrated) for the motors of the movement apparatus. The drive controller here is part of the operating apparatus 1. The control device generates a second input signal for the drive controller. This regulates the activity of the motors, controlling their position and speed. The motors of the movement apparatus then reach the position specified by the current joystick position in 10 ms, 208. The method returns to step (202).

The further query 209 checks whether the radius R is smaller than the radius R2. If true ("yes"), the control rule for the dead zone is applied, 210. Here, the positioning or movement of the movable element does not result in any activity of a movement apparatus associated with the operating apparatus, 211. If this is not true ("no"), the movable element is in the dynamic zone, 212. Application of the control rule for dynamic control, 213, results. In this case the motors remain in motion as long as the joystick lever is located in the second input zone. The method returns again to step 202, passes through the chain of questions again, and so on.

FIG. 5b shows schematically the steps of the method according to the dynamic control of the method in FIG. 5a. Step 341 provides for: computation of the difference R_rel between the current radius of the position of the movable element within the second input region 42 and the radius R2, based on the measured values α1, α2. The following step 342 provides for: use or calculation of the speed, rising between the radius R2—here v(R2)=0—and the maximum radius R_max at maximum deflection −v_max. The change in speed for a difference in radius can, for example, be given by v_max/(R_max-R2). The following step 343 provides for: interpolation between the two radii R_max and R2, in order to assign a speed to the radius R, or calculation according to v(R)=(v_max/(R_max−R2))*R. The following step 344 provides for: calculation of the direction for the moved element of the movement apparatus according to the joystick angles. The following step 345 provides for: movement of the motors in the calculated direction with the speed that has been determined. The following step 346 provides for: the motors remaining in motion as long as the joystick lever is located in the second input zone.

FIG. 5c shows schematically the steps of the method according to the proportional control of the method in FIG. 5a. Step 331 provides for: calculation of the change in position dP1 of the movable element during the time interval (here: 10 ms). Calculation of the required change in position dP2 according to proportional control. The following step 332 provides for: calculation of the speed v for the motors in such a way that the distance dP2 is travelled in one cycle (10 ms). The following step 333 provides for: moving the motors through the distance dP2 with speed v. The following step 334 provides for: the motors following the joystick position in the following 10 ms cycle.

Preferably the control device, preferably its executable program code, is constructed to execute these steps of the method according to the invention and/or other steps of the method according to the invention.

FIG. 7a shows the input region 4 having three input zones 41, 42, and 43 for an embodiment of the operating apparatus according to the invention. A proportional control, referred to as "P", can be assigned to the first input zone 41. A third input zone 43, having a third control rule, may be provided or may not be provided. Here, a third input zone 43 is provided, which is referred to as P/DD. The third input zone 43 can have a proportional control, which is referred to as "P". The proportional control P of the third input zone 42 can be identical or, alternatively, can be different from the proportional control P of the first input zone 41. Alternatively, the third control rule can be a control rule for a dead zone, the dead zone being referred to as DD. Configuring the third zone to be a dead zone means that the moved element 11 would not move when the movable element 5 is arranged within the dead zone, and can mean that the moved element 11 does not move when the movable element 5 is moved within the dead zone. A dynamic control, referred to as "D", is assigned to the second input zone 42 in this embodiment.

FIG. 7b shows a diagram with a Cartesian coordinate system, whose point of origin corresponds to the center point of the input area shown in FIG. 7a, and whose x-axis corresponds to the position value P_rel along the axis A shown in FIG. 7a, wherein the function for the velocity v(P_rel) in dependence on P_rel is schematically shown, in particular, within the input zones P, P/DD and D, as an example. In the present example, the dynamic control D is configured such that v(P_rel) is not proportional to P_rel. However, v(P_rel) being proportional to P_rel would be possible and is shown in the area "D" by the dotted line. Following the solid line in the area D in FIG. 7b, the velocity v(P_rel) increases over the whole width of the second input zone 42 with increasing P_rel by a manner, which is more than a linear increase, in the present example of a preferred embodiment of the operating apparatus, when the movable element, i.e. the joystick lever, is further pushed outwardly. This way, a particular fast displacement of the moved element 11 is possible in the outer region of the second input zone 42. The change of the velocity function v(P_rel), which depends on P_rel, corresponds to a function f=(d/dP_rel) v(P_rel), wherein f itself is a function of P_rel, and preferably f is proportional to P_rel. In the present case, the velocity v is realized to be a function having a continuous course without steps or sharp bends. However, the function f or v(P_rel) can also be described section-wise by subsequent arranged and adjacent curve segments, in particular linear curve segments, wherein the transition between adjacent curve segment can show a sharp bend, in particular.

FIG. 7c schematically shows the velocity v(P_rel) associated with the outer, second input zone D shown in FIG. 7b, having an alternative realization of the non-linear course of the function v(P_rel) over the whole width of the second input zone 42. Here, the dynamic control is configured such the change f of the velocity v (P_rel), which depends on P_rel, is not constant, but is larger than Null for all segments of the curve f, wherein said change f is not described by a continuous function f but by, e.g., a table of values, which contains the values of the change f of the velocity in dependence on P_rel. Within a first range of values W1=P_re_1 to P_rel_2 the change of velocity is (d/dx) v(P_rel)~c1, within a second range of values W2=P_re_2 to P_rel_3 the change of velocity is (d/dx) v(P_rel)~c2, within a third range of values W3=P_re_3 to P_rel_4 the change of velocity is (d/dx) v(P_rel)~c3, and within a fourth range of values W4=P_re_4 to P_rel_5 the change of velocity is (d/dx) v(P_rel)~c4, wherein the standardization factors c1, c2, c3, and c4 are all different. Such a description of (d/dx) v(P_rel)~P_rel can be technically realized relatively easy.

The advantage of the configuration of the dynamic control shown in FIG. 7b or 7c is that, when moving the movable element 5 outward along P_rel, the velocity v(P_rel) increases more slowly at the begin, and increases faster in the outer sections of the second input zone 42, D. This way, an intuitive and efficient operation of the operating apparatus is achieved.

FIG. 8a shows the input area 4 with three input zones 41, 42 and 43 according to an embodiment of the operating apparatus according to the invention, wherein the sliding guide element is arranged in a first arrangement of a zero position. The sliding guide element is configured in the same manner as described before with respect to FIGS. 3a to 3c. In the first arrangement of the zero position of the sliding guide element, which is shown in FIG. 3a, the outer contour 26a of the cutout of the sliding guide element exactly at the boundary 61 between the first and the third input zone. Such an arrangement is an ideal arrangement. The boundary between the second and the third input zone is referred to as "62". However, in practice, deviations of the arrangement of the zero position to the ideal position may occur, which deviations can be caused by manufacturing tolerances or by deterioration. Such a problem can be solved, in particular, by providing the third input zone and by an appropriate configuration of the third input zone and by choice of an appropriate relative position of the sliding guide element and the input zone, as it is shown in FIG. 8b.

FIG. 8b shows the input area from FIG. 8a, wherein the sliding guide element is arranged in a second arrangement of a zero position. It is shown that the outer contour 26a of the cutout of the sliding guide element is arranged out of center with respect to the center point of the circle-shaped or annular-shaped input regions 41, 42, 43. The size of the third input zone is chosen such that the outer contour 26a of the sliding guide element is located within the third input zone despite of the asymmetric positioning. Even in the non-ideal arrangement of the zero position of the sliding guide element, the outer contour 26a of the sliding guide element does not overlap with the second input zone 42, but is arranged outside of the second input zone. The third control rule, which is assigned to the third input zone, is configured such that the motion of the moved element 11 of the movement apparatus is stopped when the sliding guide element arrives in the zero position, because the moved element does not move if the movable element is arranged in the third input zone. This way, a safe stop of the motion of the moved element 11 is achieved independent from whether the zero position of the sliding guide element is in the ideal arrangement, shown in FIG. 8a, or in a non-ideal arrangement as shown in FIG. 8b. The arrangement of the outer contour 26a of the sliding guide element, being arranged at the boundary between the third and the first input zone in the zero position, increases the operating reliability of the operating apparatus. In the case that the user releases the movable element, i.e. the joystick lever, the moved part is reproducibly and safely stopped during the lifetime of the operating apparatus. This way, unintended damaging of the micromanipulation device, which is operated by the operating device according to the invention, or damaging of valuable biological samples can be prevented.

The invention claimed is:

1. An operating apparatus for the control of a movement apparatus of a micropositioning apparatus, which movement apparatus drives a moved element, the operating apparatus comprising:
    an electrical control device and
    an input device comprising an input region;
    the operating apparatus being configured to detect a position value that can be changed by a user through the input device, said value representing a position and/or movement of a movable element that can be located within the input region;
    the input device being configured to generate an electrical signal which depends on the position value and which electrical signal is configured to serve as an input signal for the electrical control device, and the electrical control device being configured to generate an output signal which depends on the input signal and with which the movement of the moved element of the movement apparatus is controlled;
    the input region comprising at least a first input zone and a second input zone, and the electrical control device being configured to:
        generate the output signal according to a first control rule depending on the input signal, when the movable element is located in the first input zone;
        generate the output signal according to a second control rule depending on the input signal when the movable element is located in the second input zone;
    the operating apparatus comprising an apparatus for force feedback, which is configured to oppose the user with a changeable opposing force depending on the position value when the user changes the position of the movable element; and
    the apparatus for force feedback comprising a sliding guide element spring-mounted about a zero position by a spring device, said sliding guide element comprising a cutout that serves as a sliding guide, the inner face of which serves as a slide track for the movable element, wherein a contour of the cutout of the sliding guide element has the same shape and size as the zone boundary that forms the transition from the first input zone into the second input zone.

2. The operating apparatus according to claim 1, wherein the first control rule is configured to generate a proportional control of the movement of the moved element of the movement apparatus, depending on the position value.

3. The operating apparatus according to claim 2, wherein the second input zone comprises at least a first zone segment (W1) and a second zone segment (W2), the first zone segment (W1) being arranged between the first input zone and the second zone segment (W2), wherein the position value representing the position of the movable element is referred to as P_rel and the change f of a velocity v(P_rel)

of the moved element with respect to the position value P_rel is the derivative of v(P_rel) with respect to P_rel, i.e. f=(d/dP_rel) v(P_rel), the values of the change f being lower within W1 than within W2.

4. The operating apparatus according to claim 3, wherein, in the second input zone, a dynamic control of the motion of the moved element of the movement apparatus is configured to be dependent on the position value P_rel and is configured such that f is greater than zero and is proportional to P_rel.

5. The operating apparatus according to claim 1, wherein the second control rule is configured to generate a dynamic control of the movement of the moved element of the movement apparatus, depending on the position value.

6. The operating apparatus according to claim 1, wherein the input region comprises a dead zone as a third input zone and wherein the third input zone is located between the first and the second input zones.

7. The operating apparatus according to claim 1, wherein first and second input zone are separated by at least one zone boundary and the operating apparatus comprises a signal device that is configured to indicate to the user a change between the first and second input zones when the movable element changes its position in such a way that it passes over said zone boundary.

8. The operating apparatus according to claim 7, wherein the signal device is configured to provide the user with a user signal when this change occurs.

9. The operating apparatus according to claim 8, wherein the user signal comprises a tactile signal, an acoustic signal, or an optical signal.

10. The operating apparatus according to claim 7, wherein the signal device is configured to provide the user with a user signal when the change between the dead zone and the second input zone occurs.

11. The operating apparatus according to claim 10, wherein the apparatus for force feedback serves as this signal device.

12. The operating apparatus according to claim 10, wherein the user signal comprises a tactile signal, an acoustic signal, or an optical signal.

13. The operating apparatus according to claim 1, wherein the apparatus for force feedback serves as a reset device in order to return the movable element to an initial position by means of the opposing force.

14. The operating apparatus according to claim 1, wherein the movable element is a joystick lever.

15. An operating apparatus according to any one of claims 1 to 4, 10, 11, 13, and 14 comprising the movement apparatus that drives the moved element, wherein the movement apparatus comprises at least one drive and the moved element is configured to be moved by the at least one drive.

16. A method for generating the output signal for the control of the movement apparatus of the micropositioning apparatus driving the moved element of claim 1, the method comprising:
generating the electrical signal with the input device of the operating apparatus according to claim 1, wherein the input device comprises the input region, said electrical signal serving as the input signal for the electrical control device of the operating apparatus and
generating the output signal with the electrical control device, wherein the output signal depends on the input signal, and wherein the output signal is used to control the position and/or movement of the movement apparatus;
wherein the input region comprises the first input zone where the output signal is generated by the control device according to the first control rule, which depends on the input signal, when the movable element of the input device is located in the first input zone and
wherein the input region comprises the second input zone where the output signal is generated by the control device according to the second control rule, which depends on the input signal, when the movable element of the input device is located in the second input zone.

17. A method for manipulating one or more biological cells, the method comprising:
contacting the one or more biological cells with the micropositioning apparatus comprising the operating apparatus according to any one of claim 10, 11, 13, or 14 and manipulating the one or more biological cells.

* * * * *